(12) United States Patent
Sutardja et al.

(10) Patent No.: US 9,158,355 B2
(45) Date of Patent: Oct. 13, 2015

(54) DYNAMIC CORE SWITCHING

(75) Inventors: Sehat Sutardja, Los Altos Hills, CA (US); Hong-Yi Chen, Fremont, CA (US); Premanand Sakarda, Acton, MA (US); Mark N. Fullerton, Austin, TX (US); Jay Heeb, Gilbert, AZ (US)

(73) Assignee: Marvell World Trade LTD., St. Michael (BB)

( * ) Notice: Subject to any disclaimer, the term of this patent is extended or adjusted under 35 U.S.C. 154(b) by 1641 days.

(21) Appl. No.: 12/215,760

(22) Filed: Jun. 30, 2008

(65) Prior Publication Data

US 2008/0288748 A1    Nov. 20, 2008

Related U.S. Application Data

(63) Continuation of application No. 12/145,660, filed on Jun. 25, 2008, now abandoned, which is a continuation-in-part of application No. 11/523,996, filed on Sep. 20, 2006, now abandoned.

(Continued)

(51) Int. Cl.
*G06F 15/76* (2006.01)
*G06F 1/32* (2006.01)
(Continued)

(52) U.S. Cl.
CPC .............. *G06F 1/3203* (2013.01); *G06F 1/329* (2013.01); *G06F 1/3287* (2013.01); *G06F 1/3293* (2013.01); *G06F 9/3017* (2013.01); *G06F 9/30174* (2013.01); *G06F 9/30189* (2013.01);

(Continued)

(58) Field of Classification Search
CPC ... G06F 9/30189; G06F 9/3885; G06F 9/461; G06F 9/4856; G06F 9/4893; G06F 1/3287; G06F 1/3293
USPC ........ 712/34, 43; 713/323, 324; 345/502, 505
See application file for complete search history.

(56) References Cited

U.S. PATENT DOCUMENTS

| 4,425,615 A | 1/1984 | Swenson et al. |
| 5,150,465 A | 9/1992 | Bush et al. |

(Continued)

FOREIGN PATENT DOCUMENTS

| CN | 1550951 | 12/2004 |
| EP | 0 666 539 A | 8/1995 |

(Continued)

OTHER PUBLICATIONS

Lefurgy et al., "Enegy Management for Commercial Servers,", Computer, IEEE, Dec. 2003, vol. 36, iss. 12, pp. 39-48.*

(Continued)

*Primary Examiner* — Benjamin Geib

(57) ABSTRACT

A core switching system includes a mode switching module that receives a switch signal to switch operation between a first mode and a second mode. During the first mode, instructions associated with applications are executed by a first asymmetric core, and a second asymmetric core is inactive. During the second mode, the instructions are executed by the second asymmetric core, and the first asymmetric core is inactive. A core activation module stops processing of the applications by the first asymmetric core after interrupts are disabled. A state transfer module transfers a state of the first asymmetric core to the second asymmetric core. The core activation module allows the second asymmetric core to resume execution of the instructions and the interrupts are enabled.

37 Claims, 17 Drawing Sheets

Related U.S. Application Data

(60) Provisional application No. 60/968,143, filed on Aug. 27, 2007, provisional application No. 60/978,936, filed on Oct. 10, 2007, provisional application No. 60/981,606, filed on Oct. 22, 2007, provisional application No. 61/022,431, filed on Jan. 21, 2008, provisional application No. 61/029,476, filed on Feb. 18, 2008, provisional application No. 61/049,641, filed on May 1, 2008, provisional application No. 61/058,050, filed on Jun. 2, 2008, provisional application No. 60/825,368, filed on Sep. 12, 2006, provisional application No. 60/823,453, filed on Aug. 24, 2006, provisional application No. 60/822,015, filed on Aug. 10, 2006.

(51) Int. Cl.
*G06F 9/30* (2006.01)
*G06F 9/38* (2006.01)
*G06F 9/46* (2006.01)
*G06F 9/48* (2006.01)

(52) U.S. Cl.
CPC ............... *G06F 9/38* (2013.01); *G06F 9/3885* (2013.01); *G06F 9/461* (2013.01); *G06F 9/4856* (2013.01); *G06F 9/4893* (2013.01); *Y02B 60/121* (2013.01); *Y02B 60/1278* (2013.01); *Y02B 60/1282* (2013.01); *Y02B 60/144* (2013.01); *Y02B 60/162* (2013.01); *Y02B 60/32* (2013.01)

(56) References Cited

U.S. PATENT DOCUMENTS

| | | | | |
|---|---|---|---|---|
| 5,293,500 | A | 3/1994 | Ishida et al. | |
| 5,455,913 | A | 10/1995 | Shrock et al. | |
| 5,485,595 | A | 1/1996 | Assar et al. | |
| 5,502,838 | A | 3/1996 | Kikinis | |
| 5,581,736 | A | 12/1996 | Smith | |
| 5,596,708 | A | 1/1997 | Weber | |
| 5,659,718 | A | 8/1997 | Osman et al. | |
| 5,768,164 | A | 6/1998 | Hollon, Jr. | |
| 5,809,336 | A | 9/1998 | Moore et al. | |
| 5,873,125 | A | 2/1999 | Kawamoto | |
| 5,937,423 | A | 8/1999 | Robinson | |
| 6,006,320 | A | 12/1999 | Parady | |
| 6,035,408 | A | 3/2000 | Huang et al. | |
| 6,058,414 | A | 5/2000 | Manikundalam et al. | |
| 6,122,720 | A | 9/2000 | Cliff | |
| 6,219,742 | B1 * | 4/2001 | Stanley .................. | 710/260 |
| 6,282,614 | B1 | 8/2001 | Musoll | |
| 6,405,320 | B1 * | 6/2002 | Lee et al. .................. | 713/300 |
| 6,457,135 | B1 | 9/2002 | Cooper | |
| 6,493,846 | B1 | 12/2002 | Kondo et al. | |
| 6,496,915 | B1 | 12/2002 | Halleck | |
| 6,501,999 | B1 | 12/2002 | Cai | |
| 6,513,124 | B1 * | 1/2003 | Furuichi et al. ............ | 713/322 |
| 6,567,839 | B1 | 5/2003 | Borkenhagen et al. | |
| 6,578,129 | B1 | 6/2003 | Da Silva Junior et al. | |
| 6,594,724 | B1 | 7/2003 | Smith | |
| 6,598,148 | B1 | 7/2003 | Moore et al. | |
| 6,624,816 | B1 | 9/2003 | Jones, Jr. | |
| 6,628,469 | B1 | 9/2003 | Hoyt | |
| 6,631,469 | B1 | 10/2003 | Silvester | |
| 6,631,474 | B1 | 10/2003 | Cai et al. | |
| 6,633,445 | B1 | 10/2003 | Wilke | |
| 6,639,827 | B2 | 10/2003 | Clark et al. | |
| 6,725,336 | B2 | 4/2004 | Cherabuddi | |
| 6,732,280 | B1 * | 5/2004 | Cheok et al. .................. | 713/300 |
| 6,763,480 | B2 | 7/2004 | Harari et al. | |
| 6,775,180 | B2 | 8/2004 | Biyani et al. | |
| 6,785,829 | B1 | 8/2004 | George et al. | |
| 6,839,801 | B2 | 1/2005 | Jaquette | |
| 6,859,856 | B2 | 2/2005 | Piau et al. | |
| 6,901,485 | B2 | 5/2005 | Arimilli et al. | |
| 6,901,503 | B2 | 5/2005 | Barlow et al. | |
| 6,922,754 | B2 | 7/2005 | Liu et al. | |
| 6,925,529 | B2 | 8/2005 | Bohrer et al. | |
| 6,968,469 | B1 * | 11/2005 | Fleischmann et al. ........ | 713/324 |
| 6,976,180 | B2 | 12/2005 | Cupps et al. | |
| 6,985,778 | B2 | 1/2006 | Kim et al. | |
| 6,986,066 | B2 | 1/2006 | Morrow et al. | |
| 6,996,745 | B1 | 2/2006 | Shaylor | |
| 7,035,442 | B2 | 4/2006 | Cupps et al. | |
| 7,036,138 | B1 | 4/2006 | Tash | |
| 7,069,388 | B1 | 6/2006 | Greenfield et al. | |
| 7,080,242 | B2 | 7/2006 | Morris | |
| 7,080,271 | B2 | 7/2006 | Kardach et al. | |
| 7,082,495 | B2 | 7/2006 | DeWhitt et al. | |
| 7,093,147 | B2 | 8/2006 | Farkas et al. | |
| 7,184,003 | B2 | 2/2007 | Cupps et al. | |
| 7,221,331 | B2 | 5/2007 | Bear et al. | |
| 7,231,531 | B2 | 6/2007 | Cupps et al. | |
| 7,234,049 | B2 | 6/2007 | Choi et al. | |
| 7,240,228 | B2 | 7/2007 | Bear et al. | |
| 7,254,730 | B2 | 8/2007 | Kardach et al. | |
| 7,269,752 | B2 | 9/2007 | John | |
| 7,334,142 | B2 * | 2/2008 | Hack ............................ | 713/320 |
| 7,421,602 | B2 | 9/2008 | Sutardja | |
| 7,428,650 | B2 | 9/2008 | Kardach et al. | |
| 7,472,222 | B2 | 12/2008 | Auerbach et al. | |
| 7,492,368 | B1 | 2/2009 | Nordquist et al. | |
| 7,500,127 | B2 | 3/2009 | Fleck et al. | |
| 7,512,734 | B2 | 3/2009 | Sutardja | |
| 7,617,359 | B2 | 11/2009 | Sutardja et al. | |
| 7,634,615 | B2 | 12/2009 | Sutardja | |
| 7,636,809 | B2 | 12/2009 | Sutardja et al. | |
| 7,702,848 | B2 | 4/2010 | Sutardja et al. | |
| 7,730,335 | B2 | 6/2010 | Sutardja et al. | |
| 7,788,427 | B1 | 8/2010 | Yang | |
| 8,151,129 | B2 | 4/2012 | Sutardja | |
| 8,572,416 | B2 | 10/2013 | Sutardja et al. | |
| 2002/0083264 | A1 | 6/2002 | Coulson | |
| 2002/0086719 | A1 | 7/2002 | Kedia et al. | |
| 2002/0103951 | A1 | 8/2002 | Huber et al. | |
| 2002/0124196 | A1 | 9/2002 | Morrow et al. | |
| 2002/0129288 | A1 | 9/2002 | Loh et al. | |
| 2003/0100963 | A1 | 5/2003 | Potts et al. | |
| 2003/0110012 | A1 | 6/2003 | Orenstien et al. | |
| 2003/0135771 | A1 | 7/2003 | Cupps et al. | |
| 2003/0153354 | A1 | 8/2003 | Cupps et al. | |
| 2003/0163666 | A1 | 8/2003 | Cupps et al. | |
| 2003/0188077 | A1 | 10/2003 | Watts et al. | |
| 2003/0191972 | A1 | 10/2003 | Watts | |
| 2003/0226044 | A1 | 12/2003 | Cupps et al. | |
| 2004/0003168 | A1 | 1/2004 | Kim et al. | |
| 2004/0003309 | A1 | 1/2004 | Cai et al. | |
| 2004/0064647 | A1 | 4/2004 | DeWhitt et al. | |
| 2004/0163004 | A1 | 8/2004 | Kardach et al. | |
| 2004/0225901 | A1 | 11/2004 | Bear et al. | |
| 2004/0243761 | A1 | 12/2004 | Bohrer et al. | |
| 2005/0015562 | A1 | 1/2005 | Goodsell | |
| 2005/0064911 | A1 | 3/2005 | Chen et al. | |
| 2005/0066209 | A1 | 3/2005 | Kee et al. | |
| 2005/0131584 | A1 | 6/2005 | Law et al. | |
| 2005/0152670 | A1 | 7/2005 | Skaar | |
| 2005/0172074 | A1 | 8/2005 | Sinclair | |
| 2005/0182980 | A1 | 8/2005 | Sutardja | |
| 2005/0278559 | A1 | 12/2005 | Sutardja et al. | |
| 2005/0289361 | A1 | 12/2005 | Sutardja | |
| 2006/0004957 | A1 | 1/2006 | Hand et al. | |
| 2006/0007051 | A1 | 1/2006 | Bear et al. | |
| 2006/0031610 | A1 | 2/2006 | Liav et al. | |
| 2006/0050429 | A1 | 3/2006 | Gunderson et al. | |
| 2006/0069848 | A1 | 3/2006 | Nalawadi et al. | |
| 2006/0075185 | A1 | 4/2006 | Azzarito et al. | |
| 2006/0095807 | A1 | 5/2006 | Grochowski et al. | |
| 2006/0129861 | A1 | 6/2006 | Kee et al. | |
| 2006/0136656 | A1 | 6/2006 | Conley et al. | |
| 2006/0218324 | A1 | 9/2006 | Zayas | |
| 2006/0230226 | A1 | 10/2006 | Meir et al. | |
| 2006/0248387 | A1 | 11/2006 | Nicholson et al. | |

(56) References Cited

U.S. PATENT DOCUMENTS

| | | | |
|---|---|---|---|
| 2006/0277360 | A1 | 12/2006 | Sutardja et al. |
| 2007/0028292 | A1 | 2/2007 | Kabzinski et al. |
| 2007/0055841 | A1 | 3/2007 | Jansen et al. |
| 2007/0083785 | A1 | 4/2007 | Sutardja |
| 2007/0094444 | A1 | 4/2007 | Sutardja |
| 2007/0220246 | A1* | 9/2007 | Powell et al. ............ 713/2 |
| 2008/0005462 | A1 | 1/2008 | Pyeon et al. |
| 2008/0028245 | A1* | 1/2008 | Ober et al. ............ 713/324 |
| 2008/0307244 | A1* | 12/2008 | Bertelsen et al. ........ 713/323 |

FOREIGN PATENT DOCUMENTS

| | | | |
|---|---|---|---|
| EP | 0667579 | A1 | 8/1995 |
| EP | 0 702 305 | A | 3/1996 |
| EP | 1 605 453 | | 12/2005 |
| EP | 1 605 456 | | 12/2005 |
| JP | 10-207850 | | 7/1998 |
| JP | 2002007373 | A | 1/2002 |
| JP | 2002073497 | A | 3/2002 |
| JP | 2003167656 | A | 6/2003 |
| JP | 2003523571 | A | 8/2003 |
| JP | 2003323417 | A | 11/2003 |
| JP | 2005134820 | A | 5/2005 |
| JP | 2006266511 | A | 10/2006 |
| JP | 2011045406 | A | 3/2011 |
| JP | 2011086433 | A | 4/2011 |
| WO | WO 01/15161 | A | 3/2001 |
| WO | WO-0161442 | A1 | 8/2001 |
| WO | WO-02100117 | A2 | 12/2002 |
| WO | WO-03083694 | A1 | 10/2003 |
| WO | WO 2004/090889 | | 10/2004 |
| WO | WO 2007/081218 | | 7/2007 |

OTHER PUBLICATIONS

Kumar et al., "Single ISA Hetergeneous Multi-Core Architectures: the Potential for Processor Power Reduction", Proceedings of the 36th Annual IEEE/ACM International Symposium on Microarchitecture, 2003, pp. 81-92.*

Benini et al., "A Survey of Design Techniques for System-Level Dynamic Power Management", IEEE Transactions on Very Large Scale Integration (VLSI) Systems, Jun. 2000, vol. 8, iss. 3, pp. 299-316.*

Abramson et al., "Intel Virtualization Technology for Directed I/O", Intel Technology Journal, Aug. 10, 2006, vol. 10, iss. 3, pp. 179-192.*

U.S. Appl. No. 60/678,249, Sutardja et al.
U.S. Appl. No. 60/799,151, Sutardja et al.
U.S. Appl. No. 60/820,867, Sutardja et al.
U.S. Appl. No. 60/822,015, Sutardja et al.
U.S. Appl. No. 60/823,453, Sutardja et al.
U.S. Appl. No. 60/825,368, Sutardja et al.
U.S. Appl. No. 60/890,684, Sutardja et al.

2002 Silicon Storage Technology, Inc.; "ATA Flash Disk Controller" SST55LDo17A/SST55LD017B/SST55LD017C; Preliminary Specifications; 2002/ 52 pages.

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.

Cast, Inc. (Jun. 2004) "NFlashCtrl NAND Flash Memory Controller Megafunction"; 2 pages.

Cast, Inc., "NFlashCtrl NAND Flash Memory Controller Core"; http://ww.cast-inc.com/cores/nflashcntl/index.shtml—Jul. 29, 2005; 3 pages.

Cirrus Logic; CL-SH7660 Prelinary Product Bulletin; "Advanced Architecture ATA Disk Controller"; Sep. 1998; 4 pages.

Communication from EPO dated Aug. 31, 2006 transmitting European search report for Application No. 05010671.5-2210; 3 pages.

Communication from EPO dated Aug. 31, 2006 transmitting European search report for Application No. 05010676.4-2210; 3 pages.

Communication from EPO dated Aug. 31, 2006 transmitting European search report for Application No. 05010672.3-2210; 3 pages.

Communication from EPO dated Aug. 31, 2006 transmitting European search report for Application No. 05010673.1-2210; 3 pages.

Dean Takahashi; "PortalPlayer Takes A Leap", The Mercury News, Mar. 14, 2006, 3 pages.

Electronics Press World, "Power Digital Card (PDC) and Samsung Strikes Again As An Industry First to Release the 128MegaByte Reduced Size MultiMediaCards," http://electronics.press-world.com/v/48895/power-ditigal-card-pdc-and-samsung-strikes-again-as-an-idust . . . ; Jul. 7, 2003 3 pages.

First Office Action from the State Intellectual Property Office of PRC dated Nov. 2, 2007 for Application No. 200510077194.6; 17 pages.

First Office Action from the State Intellectual Property Office of PRC dated Nov. 2, 2007 for Application No. 200510070913.1; 19 pages.

First Office Action from the State Intellectual Property Office of PRC dated Nov. 2, 2007 for Application No. 200510077196.5; 18 pages.

First Office Action from the State Intellectual Property Office of PRC dated Oct. 12, 2007 for Application No. 200510077195.0; 7 pages.

First Official Communication from the European Patent Office dated May 22, 2007 for Application No. 05 010 673.1-1232; 4 pages.

First Official Communication from the European Patent Office dated May 22, 2007 for Application No. 05 010 672.3-1232; 4 pages.

First Official Communication from the European Patent Office dated May 22, 2007 for Application No. 05 010 671.5-1232; 5 pages.

Hachman, M., "Samsung: 'Hybrid' Hard Drives Will Ship in 2006," http://www.extremetech.com/article2/0, 1558, 1789189,00.asp, Apr. 25, 2005; 2 pages.

IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11b-1999/Cor 1-2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

MemoryClub.co.uk; "High Speed-MMC"; Kingmax HS-MMC 512mb; http://www.websetters.co.uk/MemoryClub/HSMMC.htm; 1 page.

Mittoni; "CompactFlash Controller"; http://www.mittoni.com/compactflash/article5.html; 2 pages.

Mittoni; "CompactFlash Memory Cards"; http://www.mittoni.com/compactflash/compactflash.html; 2 pages.

Optics Plantet, Inc. "Silicon Power SD/MMC Card Reader"; http://www.opticsplanet.net/silicon-power-sd-mmc-card-reader.html.

(56) References Cited

OTHER PUBLICATIONS

PCT International Search Report and Written Opinion; Dec. 20, 2007; for International Application No. PCT/US2007/011326; 13 pages.

PCT International Search Report and Written Opinion; Jan. 28, 2008; for International Application No. PCT/US2007/011328; 7 pages.

Press Release from GD Technik; Flash Memory Module Thinks It's a Hard Disk; http//www.electronicstalk.com/news/gdt/gdt17.html; Apr. 25, 2005; 2 pages.

Pretec Electronics Corp.; Mini IDE (MIDE) Flash Drive; http://www.pretec.com/product/SSD/Industrial/miniide.htm; 2005; 4 pages.

Wikipedia; "CompactFlash"; http://web.archive.org/web/20060109003035/http://en.wikipedia.org/wiki/CompactFlash_II; Jan. 9, 2006; 4 pages.

Wikipedia; "Flash Memory"; http://en.wikipedia.org/wiki/Flash_memory; 3 pages.

Notification of Transmittal of The International Search Report and The Written Opinion of The International Searching Authority, or The Declaration dated Nov. 16, 2009 in reference to PCT/US2008/074416 (12 pgs).

"Advanced Configuration and Power Interface Specification." Hewlett-Packard Corporation, Intel Corporation, Microsoft Corporation, Phoenix Technologies Ltd., Toshiba Corporation, Dec. 30, 2005. Revision 3.0a Web. pp. 1-624.

"Generation of Hard Disk Having a Size of a 500 Yen Coin" Mobile Media Magazine, Japan, C-Media Co. Ltd., Oct. 13, 1998, vol. 6, No. 11, pp. 60-61.

HDD Photo Storage—Operating Instructions for HDPS-MI SONY, [Online] Jun. 1, 2004 (Jun. 17, 2004), EP002481634 URL: http://www.manualshark.org/manualshark/files/4/pdf6738.pdf—10 pages.

"How to Increase Virtual Memory in XP", Mar. 25, 2022, Retrieved from: http://computing.net/answers/windows-xp/how-to-increase-virtual-memory-in-xp/20067.html on Aug. 3, 2009 [Online].

Communication dated Apr. 26, 2010 for Application No. JP2005-144894 with Non-Final Notice of Reasons for Rejection dated Apr. 20, 2010; 10 pages.

Communication dated Apr. 30, 2010 for Application No. JP2005-209263 with Non-Final Notice of Reasons for Rejection dated Apr. 27, 2010; 8 pages.

Communication dated Apr. 30, 2010 for Application No. JP2005-209264 with Non-Final Notice of Reasons for Rejection dated Apr. 27, 2010; 6 pages.

Communication from the European Patent Office dated Oct. 11, 2006 with the partial European Search Report for Application No. 05010993.3-1245; 5 Pages.

Communication from the European Patent Office dated Oct. 6, 2006 with the partial European Search Report for Application No. 05010992.5-1245; 5 Pages.

Communication from the European Patent Office dated Oct. 9, 2006 with the partial European Search Report for Application No. 05010994.1-1245; 5 Pages.

Edogawa, Note Facory, Nikkei Win PC, Japan, Nikkei Business Publications Inc., Sep. 1, 1999, vol. 5, No. 9, pp. 210-213.

Japanese Office Action dated Nov. 20, 2012 for JP Pat. App. No. 2009-509863.

Notification of the First Office Action from the State Intellectual Property Office of PRC dated Aug. 24, 2007 for Chinese Application No. 200510007529.7; 14 Pages.

Notification of Transmittal of the International Search Report and The Written Opinion of The International Searching Authority, or the Declaration dated Jun. 11, 2008 in reference to PCT/US2008/002194.

Seng et al., "Reducing Power with Dynamic Critical Path Information," Proceedings of the 34th Annual ACM/IEEE International Symposium on Microarchitecture, ACM, 2001, pp. 114-123.

Takao Shimizu, Forging Electric Nation,: Electric Alchemy, Electronics Talk, NHK Publishing Inc., Dec. 1, 1993, December Edition, pp. 16-17.

\* cited by examiner

DYNAMIC CORE SWITCHING

CROSS-REFERENCE TO RELATED APPLICATIONS

This application is a continuation of U.S. application Ser. No. 12/145,660, filed Jun. 25, 2008, which claims the benefit of U.S. Provisional Application No. 60/968,143, filed Aug. 27, 2007; U.S. Provisional Application No. 60/978,936, filed Oct. 10, 2007; U.S. Provisional Application No. 60/981,606, filed Oct. 22, 2007; U.S. Provisional Application No. 61/022,431 filed Jan. 21, 2008; U.S. Provisional Application No. 61/029,476, filed Feb. 18, 2008; U.S. Provisional Application No. 61/049,641, filed May 1, 2008; and U.S. Provisional Application No. 61/058,050, filed Jun. 2, 2008 and is a continuation-in-part of U.S. application Ser. No. 11/523,996, filed Sep. 20, 2006, which claims the benefit of U.S. Provisional Application No. 60/825,368, filed Sep. 12, 2006; U.S. Provisional Application No. 60/823,453, filed Aug. 24, 2006; and U.S. Provisional Application No. 60/822,015, filed Aug. 10, 2006. The disclosures of the above applications are incorporated herein by reference in their entirety.

FIELD

The present disclosure relates to mobile computing devices, and more particularly to dynamically switching cores of multi-core processing systems of mobile computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mobile computing devices such as cellular phones, MP3 players, global positioning system (GPS) devices, etc. are typically powered using both line power and battery power. The mobile computing devices typically include a processor, memory and a display, which consume power during operation. The processor generally executes both simple applications that are less processing-intensive and complex applications that are more processing-intensive. Therefore, the capabilities of the processor such as processing speed are typically selected to match the performance requirements of the most processing-intensive applications that will be executed.

One significant limitation of mobile computing devices relates to the amount of time for which the devices can be operated using batteries without recharging. Using a high-speed processor that meets the performance requirements of the processing-intensive applications generally increases power consumption, which corresponds to a relatively short battery life.

Referring now to FIGS. 1A and 1B, some desktop and laptop computers use multiple processor integrated circuits (ICs) or a single processor IC with multiple cores. These systems can be of different types. As used herein, the term processor is used to refer to an IC with one or more processing cores. A multi-core processor refers to an IC, a system-on-chip (SOC), or a system-in-package (SIP) with two or more processing cores.

In FIG. 1A, an asymmetric multi-processor (MP) system 1 comprising a main processor 2 and one or more secondary processors 3 is shown. The asymmetric MP system 1 may also be implemented as a single IC or SOC with a main core and a secondary core. The main processor 2 has a different instruction set architecture (ISA) than the secondary processors 3. An operating system (OS) may run on the main processor 2. Applications may run on the secondary processors 3. The secondary processors 3 do not run threads of the OS and may be invisible to an OS scheduler. An OS driver interface to a real-time OS (RTOS) may run on the secondary processors 3. Key functions may be offloaded to the secondary processors 3 for power saving and reducing the duty cycle of the main processor 2. For example only, the asymmetric MP system 1 can be used for special-purpose processing (e.g., video, 3D graphics, etc.). Since the secondary processors 3 may run in addition to the main processor 2 when applications are executed, the asymmetric MP system 1 may consume large amounts of power.

In FIG. 1B, a symmetric MP system 5 may comprise N identical processors, where N is an integer greater than 1. The symmetric MP system 5 may also be implemented as a single IC or SOC with N identical cores. N may be proportional to the processing load of the symmetric MP system 5. The N processors use the same ISA. The N processors may be visible to the OS scheduler. The N processors may have transparent access to system resources including memory and input/output (I/O). Depending on the processing load, one or more of the N processors can be utilized to execute applications. The high cost and high power consumption of the symmetric MP system 5 tends to make this architecture unsuitable for lower cost mobile devices.

SUMMARY

A system comprises a first asymmetric core, a second asymmetric core, and a core switching module. The first asymmetric core executes an application when the system operates in a first mode and is inactive when the system operates in a second mode. The second asymmetric core executes the application when the system operates in the second mode. The core switching module switches operation of the system between the first mode and the second mode. The core switching module selectively stops processing of the application by the first asymmetric core after receiving a first control signal. The core switching module transfers a first state of the first asymmetric core to the second asymmetric core. The second asymmetric core resumes executing the application in the second mode.

In another feature, the first control signal indicates that interrupts are disabled.

In another feature, the second asymmetric core executes instructions without instruction translation when the second asymmetric core resumes executing the application during the second mode.

In other features, the system further comprises an operating system (OS) that provides services to the application. The core switching module switches execution of the application between the first asymmetric core and the second asymmetric core transparently to the OS.

In other features, a first maximum speed of the first asymmetric core is greater than a second maximum speed of the second asymmetric core. The first asymmetric core operates at frequencies greater than a predetermined frequency. The second asymmetric core operates at frequencies less than the predetermined frequency. A first maximum operating power level of the first asymmetric core is greater than a second maximum operating power level of the second asymmetric core.

In other features, the first asymmetric core uses a first instruction set architecture (ISA). The second asymmetric core uses a second ISA. The first ISA is compatible with the second ISA. A first set of instructions of the first ISA is a superset of a second set of instructions of the second ISA. The first set includes more instructions than the second set.

In other features, the OS comprises a kernel. The core switching module executes above a level of the kernel.

In other features, the system further comprises a hypervisor module. The core switching module is integrated with the hypervisor module.

In other features, the core switching module saves the first state when the core switching module selectively stops processing of the application by the first asymmetric core. The core switching module powers up the second asymmetric core and initializes the second asymmetric core using the first state. The interrupts are enabled after the second asymmetric core resumes executing the application. The core switching module shuts down the first asymmetric core when the second asymmetric core powers up. One of no power and standby power is supplied to the first asymmetric core after the first asymmetric core is shut down.

In other features, the system further comprises a level-2 (L2) cache that communicates with the first asymmetric core. One of no power and standby power is supplied to the L2 cache after the first asymmetric core is shut down.

In other features, the core switching module initializes the first asymmetric core using the first state when the second asymmetric core fails to power up. The first asymmetric core resumes executing the application in the first mode and interrupts are enabled.

In other features, the core switching module switches operation of the system between the second mode and the first mode. The core switching module selectively stops processing of the application by the second asymmetric core after receiving the first control signal. The core switching module transfers a second state of the second asymmetric core to the first asymmetric core. The first asymmetric core resumes executing the application in the first mode. The first control signal indicates that interrupts are disabled.

In another feature, instructions are executed without instruction translation when the first asymmetric core resumes executing the application during the first mode.

In other features, the system further comprises an operating system (OS) that provides services to the application. The core switching module switches execution of the application between the second asymmetric core and the first asymmetric core transparently to the OS.

In other features, the core switching module saves the second state when the core switching module selectively stops processing of the application by the second asymmetric core. The core switching module powers up the first asymmetric core and initializes the first asymmetric core using the second state. The interrupts are enabled after the first asymmetric core resumes executing the application.

In other features, the system further comprises a level-2 (L2) cache that communicates with the first asymmetric core. Power is supplied to the L2 cache after the first asymmetric core powers up.

In other features, the core switching module shuts down the second asymmetric core when the first asymmetric core powers up. One of no power and standby power is supplied to the second asymmetric core after the second asymmetric core is shut down.

In other features, the core switching module initializes the second asymmetric core using the second state when the first asymmetric core fails to power up. The second asymmetric core resumes executing the application in the second mode, and the interrupts are enabled.

In another feature, the system further comprises a core profile module that generates a second control signal based on at least one of core utilization, resource utilization, and performance of the application.

In other features, the system further comprises a core change sequence (CCS) module that initiates a CCS based on the second control signal. The core switching module switches execution of the application between one of the first and second asymmetric cores and another of the first and second asymmetric cores based on the CCS.

In other features, the CCS module initiates the CCS when the core utilization of the second asymmetric core by the application is greater than or equal to a first predetermined threshold. The CCS module initiates the CCS when the core utilization of the second asymmetric core by the application is greater than or equal to a second predetermined threshold for a first predetermined time period. The CCS module initiates the CCS when an anticipated core utilization of the second asymmetric core is greater than or equal to a third predetermined threshold. The anticipated core utilization is determined based on at least one of a type of the application and a history of execution of the application. The CCS module initiates the CCS when the core utilization of the first asymmetric core by the application is less than or equal to a fourth predetermined threshold. The CCS module initiates the CCS when the core utilization of the first asymmetric core by the application is less than or equal to a fifth predetermined threshold for a second predetermined time period.

In another feature, the CCS module initiates the CCS based on at least one of a type of the application, a number of applications, and a type of instruction executed by one of the first and second asymmetric cores.

In another feature, the core profile module generates the second control signal based on a number of times execution of applications is switched between one of the first and second asymmetric cores and another of the first and second asymmetric cores.

In other features, the system further comprises a power control module that controls power consumption of the system and that generates a third control signal based on the second control signal and the power consumption. The system further comprises a core change sequence (CCS) module that initiates a CCS based on the third control signal. The core switching module switches execution of the application between one of the first and second asymmetric cores and another of the first and second asymmetric cores based on the CCS.

In another feature, the system further comprises a frequency change sequence (FCS) module that initiates a FCS based on the second control signal and that selects an operating frequency of at least one of the first and second asymmetric cores based on the FCS.

In another feature, the system further comprises a voltage change sequence (VCS) module that initiates a VCS based on the second control signal and that selects a supply voltage of at least one of the first and second asymmetric cores based on the VCS.

In another feature, the system further comprises a power management module that disables the interrupts when the system switches operation between the first mode and the second mode and that disables the interrupts when the system switches operation between the second mode and the first mode.

In other features, the system further comprises a plurality of the first asymmetric core. The core switching module selectively activates and deactivates more than one of the plurality of the first asymmetric core based on the CCS when the system operates in the first mode.

In another feature, the system further comprises a glue logic module that selectively communicates with the core switching module, that receives interrupts, that receives first signals from the application, and that routes the interrupts and the first signals to the one of the first and second asymmetric cores activated by the core switching module.

In another feature, a system-on-chip (SOC) comprises the system.

In another feature, a system-in-package (SIP) comprises the system.

In still other features, a method comprises executing an application using a first asymmetric core when operating in a first mode. The first asymmetric core is inactive when operating in a second mode. The method further comprises switching operation between the first mode and the second mode using a core switching module. The method further comprises selectively stopping processing of the application by the first asymmetric core using the core switching module after receiving a first control signal. The method further comprises transferring a first state of the first asymmetric core to the second asymmetric core using the core switching module and resuming execution of the application in the second mode using the second asymmetric core.

In another feature, the method further comprises disabling interrupts and indicating via the first control signal that the interrupts are disabled.

In another feature, the method further comprises executing instructions without instruction translation when the second asymmetric core resumes executing the application during the second mode.

In another feature, the method further comprises providing services to the application via an operating system (OS) and switching execution of the application between the first asymmetric core and the second asymmetric core transparently to the OS using the core switching module.

In other features, the method further comprises selectively operating the first asymmetric core at a first maximum speed and selectively operating the second asymmetric core at a second maximum speed. The first maximum speed is greater than the second maximum speed. The method further comprises selectively operating the first asymmetric core at a first maximum operating power level and selectively operating the second asymmetric core at a second maximum operating power level. The first maximum operating power level is greater than the second maximum operating power level. The method further comprises selectively operating the first asymmetric core at frequencies greater than a predetermined frequency and selectively operating the second asymmetric core at frequencies less than the predetermined frequency.

In other features, the method further comprises operating the first asymmetric core using a first instruction set architecture (ISA) and operating the second asymmetric core using a second ISA. The first ISA is compatible with the second ISA. The method further comprises operating the first asymmetric core using a first set of instructions of the first ISA and operating the second asymmetric core using a second set of instructions of the second ISA. The first set is a superset of the second set. The first set includes more instructions than the second set.

In another feature, the method further comprises providing a kernel of the OS and executing the core switching module above a level of the kernel.

In another feature, the method further comprises providing a hypervisor module and integrating the core switching module with a hypervisor module.

In other features, the method further comprises saving the first state when the core switching module selective stops processing of the application by the first asymmetric core. The method further comprises powering up the second asymmetric core and initializing the second asymmetric core using the first state. The method further comprises enabling the interrupts after the second asymmetric core resumes executing the application. The method further comprises shutting down the first asymmetric core when the second asymmetric core powers up and supplying one of no power and standby power to the first asymmetric core after the first asymmetric core is shut down.

In other features, the method further comprises providing a level-2 (L2) cache. The first asymmetric core communicates with the L2 cache when the first asymmetric core is active. The method further comprises supplying one of no power and standby power to the L2 cache after the first asymmetric core is shut down.

In another feature, the method further comprises initializing the first asymmetric core using the first state when the second asymmetric core fails to power up, resuming execution of the application in the first mode using the first asymmetric core, and enabling interrupts.

In another feature, the method further comprises switching operation between the second mode and the first mode using a core switching module, selectively stopping processing of the application by the second asymmetric core using the core switching module after receiving the first control signal indicating that interrupts are disabled, transferring a second state of the second asymmetric core to the first asymmetric core using the core switching module, and resuming execution of the application in the first mode using the first asymmetric core.

In another feature, the method further comprises executing instructions without instruction translation when the first asymmetric core resumes executing the application during the first mode.

In another feature, the method further comprises providing services to the application via an operating system (OS) and switching execution of the application between the second asymmetric core and the first asymmetric core transparently to the OS using the core switching module.

In other features, the method further comprises saving the second state when the core switching module selectively stops processing of the application by the second asymmetric core. The method further comprises powering up the first asymmetric core and initializing the first asymmetric core using the second state. The method further comprises enabling the interrupts after the first asymmetric core resumes executing the application.

In other features, the method further comprises providing a level-2 (L2) cache. The first asymmetric core communicates with the L2 cache when the first asymmetric core is active. The method further comprises supplying power to the L2 cache after the first asymmetric core powers up.

In other features, the method further comprises shutting down the second asymmetric core when the first asymmetric core powers up and supplying one of no power and standby power to the second asymmetric core after the second asymmetric core is shut down.

In another feature, the method further comprises initializing the second asymmetric core using the second state when the first asymmetric core fails to power up, resuming execution of the application in the second mode using the second asymmetric core, and enabling the interrupts.

In another feature, the method further comprises generating a second control signal based on at least one of core utilization, resource utilization, and performance of the application.

In another feature, the method further comprises initiating a core change sequence (CCS) based on the second control signal and switching execution of the application between one of the first and second asymmetric cores and another of the first and second asymmetric cores based on the CCS using the core switching module.

In other features, the method further comprises initiating the CCS when the core utilization of the second asymmetric core by the application is greater than or equal to a first predetermined threshold. The method further comprises initiating the CCS when the core utilization of the second asymmetric core by the application is greater than or equal to a second predetermined threshold for a first predetermined time period. The method further comprises initiating the CCS when the core utilization of the first asymmetric core by the application is less than or equal to a third predetermined threshold. The method further comprises initiating the CCS when the core utilization of the first asymmetric core by the application is less than or equal to a fourth predetermined threshold for a first predetermined time period.

In another feature, the method further comprises determining an anticipated core utilization based on at least one of a type of the application and a history of execution of the application and initiating the CCS when the anticipated core utilization of the second asymmetric core is greater than or equal to a predetermined threshold.

In another feature, the method further comprises initiating the CCS based on at least one of a number of applications executed by one of the first and second asymmetric cores, a type of the application executed by one of the first and second asymmetric cores, and a type of instruction executed by one of the first and second asymmetric cores.

In another feature, the method further comprises generating the second control signal based on a number of times execution of applications is switched between one of the first and second asymmetric cores and another of the first and second asymmetric cores.

In another feature, the method further comprises controlling power consumption, generating a third control signal based on the second control signal and the power consumption, initiating a core change sequence (CCS) based on the third control signal, and switching execution of the application between one of the first and second asymmetric cores and another of the first and second asymmetric cores based on the CCS using the core switching module.

In another feature, the method further comprises initiating a frequency change sequence (FCS) based on the second control signal and selecting an operating frequency of at least one of the first and second asymmetric cores based on the FCS.

In another feature, the method further comprises initiating a voltage change sequence (VCS) based on the second control signal and selecting a supply voltage of at least one of the first and second asymmetric cores based on the VCS.

In another feature, the method further comprises providing a plurality of the first asymmetric core, and selectively activating and deactivating more than one of the plurality of the first asymmetric core based on the CCS when operating in the first mode using the core switching module.

In another feature, the method further comprises providing a glue logic module, selectively communicating with the core switching module using the glue logic module, receiving interrupts via the glue logic module, receiving first signals from the application via the glue logic module, and routing the interrupts and the first signals to the one of the first and second asymmetric cores activated by the core switching module using the glue logic module.

In another feature, the method further comprises providing the first and second asymmetric cores and the core switching module in one of a system-on-chip (SOC) and a system-in-package (SIP).

In still other features, a system comprises first core means for executing an application when the system operates in a first mode. The first asymmetric core means is inactive when the system operates in a second mode. The system further comprises second asymmetric core means for executing the application when the system operates in the second mode. The system further comprises core switching means for switching operation between the first mode and the second mode. The core switching means selectively stops processing of the application by the first asymmetric core means after receiving a first control signal. The core switching means transfers a first state of the first asymmetric core means to the second asymmetric core means. The second asymmetric core means resumes executing the application in the second mode.

In another feature, the first control signal indicates that interrupts are disabled.

In another feature, the second asymmetric core means executes instructions without instruction translation when the second asymmetric core means resumes executing the application during the second mode.

In other features, the system further comprises an operating system (OS) that provides services to the application. The core switching module switches execution of the application between the first asymmetric core means and the second asymmetric core means transparently to the OS.

In other features, a first maximum speed of the first asymmetric core means is greater than a second maximum speed of the second asymmetric core means. The first asymmetric core means operates at frequencies greater than a predetermined frequency. The second asymmetric core means operates at frequencies less than the predetermined frequency. A first maximum operating power level of the first asymmetric core means is greater than a second maximum operating power level of the second asymmetric core means.

In other features, the first asymmetric core means uses a first instruction set architecture (ISA). The second asymmetric core means uses a second ISA. The first ISA is compatible with the second ISA. A first set of instructions of the first ISA is a superset of a second set of instructions of the second ISA. The first set includes more instructions than the second set.

In other features, the OS comprises a kernel. The core switching means executes above a level of the kernel.

In other features, the system further comprises hypervisor means for switching cores. The core switching means is integrated with the hypervisor means.

In other features, the core switching means saves the first state when the core switching means selectively stops processing of the application by the first asymmetric core means. The core switching means powers up the second asymmetric core means and initializes the second asymmetric core means using the first state. The interrupts are enabled after the second asymmetric core means resumes executing the application. The core switching means shuts down the first asymmetric core means when the second asymmetric core means powers up. One of no power and standby power is supplied to the first asymmetric core means after the first asymmetric core means is shut down.

In other features, the system further comprises level-2 (L2) cache means for caching instructions and data of the first asymmetric core means. One of no power and standby power is supplied to the L2 cache means after the first asymmetric core means is shut down.

In other features, the core switching means initializes the first asymmetric core means using the first state when the second asymmetric core means fails to power up. The first asymmetric core means resumes executing the application in the first mode and interrupts are enabled.

In other features, the core switching means switches operation of the system between the second mode and the first mode. The core switching means selectively stops processing of the application by the second asymmetric core means after receiving the first control signal indicating that interrupts are disabled. The core switching means transfers a second state of the second asymmetric core means to the first asymmetric core means. The first asymmetric core means resumes executing the application in the first mode.

In another feature, instructions are executed without instruction translation when the first asymmetric core means resumes executing the application during the first mode.

In other features, the system further comprises an operating system (OS) that provides services to the application. The core switching means switches execution of the application between the second asymmetric core means and the first asymmetric core means transparently to the OS.

In other features, the core switching means saves the second state when the core switching means selectively stops processing of the application by the second asymmetric core means. The core switching means powers up the first asymmetric core means and initializes the first asymmetric core means using the second state. The interrupts are enabled after the first asymmetric core means resumes executing the application.

In other features, the system further comprises level-2 (L2) cache means for caching instructions and data of the first asymmetric core means. Power is supplied to the L2 cache means after the first asymmetric core means powers up.

In other features, the core switching means shuts down the second asymmetric core means when the first asymmetric core means powers up. One of no power and standby power is supplied to the second asymmetric core means after the second asymmetric core means is shut down.

In other features, the core switching means initializes the second asymmetric core means using the second state when the first asymmetric core means fails to power up. The second asymmetric core means resumes executing the application in the second mode, and the interrupts are enabled.

In another feature, the system further comprises core profile means for generating a second control signal based on at least one of core utilization, resource utilization, and performance of the application.

In other features, the system further comprises core change sequence (CCS) means for initiating a CCS based on the second control signal. The core switching means switches execution of the application between one of the first and second asymmetric core means and another of the first and second asymmetric core means based on the CCS.

In other features, the CCS means initiates the CCS when the core utilization of the second asymmetric core means by the application is greater than or equal to a first predetermined threshold. The CCS means initiates the CCS when the core utilization of the second asymmetric core means by the application is greater than or equal to a second predetermined threshold for a first predetermined time period. The CCS means initiates the CCS when an anticipated core utilization of the second asymmetric core means is greater than or equal to a third predetermined threshold. The anticipated core utilization is determined based on at least one of a type of the application and a history of execution of the application. The CCS means initiates the CCS when the core utilization of the first asymmetric core means by the application is less than or equal to a fourth predetermined threshold. The CCS means initiates the CCS when the core utilization of the first asymmetric core means by the application is less than or equal to a fifth predetermined threshold for a second predetermined time period.

In another feature, the CCS means initiates the CCS based on at least one of a type of the application, a number of applications, and a type of instruction that is executed by one of the first and second asymmetric core means.

In another feature, the core profile means generates the second control signal based on a number of times execution of applications is switched between one of the first and second asymmetric core means and another of the first and second asymmetric core means.

In others feature, the system further comprises power control means for controlling power consumption of the system and for generating a third control signal based on the second control signal and the power consumption. The system further comprises core change sequence (CCS) means that initiates a CCS based on the third control signal. The core switching means switches execution of the application between one of the first and second asymmetric core means and another of the first and second asymmetric core means based on the CCS.

In another feature, the system further comprises frequency change sequence (FCS) means for initiating a FCS based on the second control signal and for selecting an operating frequency of at least one of the first and second asymmetric core means based on the FCS.

In another feature, the system further comprises voltage change sequence (VCS) means for initiating a VCS based on the second control signal and for selecting a supply voltage of at least one of the first and second asymmetric core means based on the VCS.

In another feature, the system further comprises power management means for disabling the interrupts when the system switches the operation between the first mode and the second mode and for disabling the interrupts when the system switches the operation between the second mode and the first mode.

In other features, the system further comprises a plurality of the first asymmetric core means. The core switching module selectively activates and deactivates more than one of the plurality of the first asymmetric core means based on the CCS when the system operates in the first mode.

In other features, the system further comprises glue logic means for selectively communicating with the core switching module. The glue logic means receives interrupts, receives first signals from the application, and routes the interrupts and the first signals to the one of the first and second asymmetric core means activated by the core switching module.

In another feature, a system-on-chip (SOC) comprises the system.

In another feature, a system-in-package (SIP) comprises the system.

In still other features, a computer program stored on a computer readable medium and executed by a processor comprises executing an application using a first asymmetric core when operating in a first mode. The first asymmetric core is inactive when operating in a second mode. The computer program further comprises switching operation between the first mode and the second mode using a core switching module. The computer program further comprises selectively stopping processing of the application by the first asymmetric core using the core switching module after receiving a first control signal. The computer program further comprises transferring a first state of the first asymmetric core to the second asymmetric core using the core switching module and resuming execution of the application in the second mode using the second asymmetric core.

In another feature, the computer program further comprises disabling interrupts and indicating via the first control signal that the interrupts are disabled.

In another feature, the computer program further comprises executing instructions without instruction translation when the second asymmetric core resumes executing the application during the second mode.

In another feature, the computer program further comprises providing services to the application via an operating system (OS) and switching execution of the application between the first asymmetric core and the second asymmetric core transparently to the OS using the core switching module.

In other features, the computer program further comprises selectively operating the first asymmetric core at a first maximum speed and selectively operating the second asymmetric core at a second maximum speed. The first maximum speed is greater than the second maximum speed. The computer program further comprises selectively operating the first asymmetric core at a first maximum operating power level and selectively operating the second asymmetric core at a second maximum operating power level. The first maximum operating power level is greater than the second maximum operating power level. The computer program further comprises selectively operating the first asymmetric core at frequencies greater than a predetermined frequency and selectively operating the second asymmetric core at frequencies less than the predetermined frequency.

In other features, the computer program further comprises operating the first asymmetric core using a first instruction set architecture (ISA) and operating the second asymmetric core using a second ISA. The first ISA is compatible with the second ISA. The computer program further comprises operating the first asymmetric core using a first set of instructions of the first ISA and operating the second asymmetric core using a second set of instructions of the second ISA. The first set is a superset of the second set. The first set includes more instructions than the second set.

In another feature, the computer program further comprises providing a kernel of the OS and executing the core switching module above a level of the kernel.

In another feature, the computer program further comprises providing a hypervisor module and integrating the core switching module with a hypervisor module.

In other features, the computer program further comprises saving the first state when the core switching module selective stops processing of the application by the first asymmetric core. The computer program further comprises powering up the second asymmetric core and initializing the second asymmetric core using the first state. The computer program further comprises enabling the interrupts after the second asymmetric core resumes executing the application. The computer program further comprises shutting down the first asymmetric core when the second asymmetric core powers up and supplying one of no power and standby power to the first asymmetric core after the first asymmetric core is shut down.

In other features, the computer program further comprises providing a level-2 (L2) cache. The first asymmetric core communicates with the L2 cache when the first asymmetric core is active. The computer program further comprises supplying one of no power and standby power to the L2 cache after the first asymmetric core is shut down.

In another feature, the computer program further comprises initializing the first asymmetric core using the first state when the second asymmetric core fails to power up, resuming execution of the application in the first mode using the first asymmetric core, and enabling interrupts.

In another feature, the computer program further comprises switching operation between the second mode and the first mode using a core switching module, selectively stopping processing of the application by the second asymmetric core using the core switching module after receiving the first control signal indicating that interrupts are disabled, transferring a second state of the second asymmetric core to the first asymmetric core using the core switching module, and resuming execution of the application in the first mode using the first asymmetric core.

In another feature, the computer program further comprises executing instructions without instruction translation when the first asymmetric core resumes executing the application during the first mode.

In another feature, the computer program further comprises providing services to the application via an operating system (OS) and switching execution of the application between the second asymmetric core and the first asymmetric core transparently to the OS using the core switching module.

In other features, the computer program further comprises saving the second state when the core switching module selectively stops processing of the application by the second asymmetric core. The computer program further comprises powering up the first asymmetric core and initializing the first asymmetric core using the second state. The computer program further comprises enabling the interrupts after the first asymmetric core resumes executing the application.

In other features, the computer program further comprises providing a level-2 (L2) cache. The first asymmetric core communicates with the L2 cache when the first asymmetric core is active. The computer program further comprises supplying power to the L2 cache after the first asymmetric core powers up.

In other features, the computer program further comprises shutting down the second asymmetric core when the first asymmetric core powers up and supplying one of no power and standby power to the second asymmetric core after the second asymmetric core is shut down.

In another feature, the computer program further comprises initializing the second asymmetric core using the second state when the first asymmetric core fails to power up, resuming execution of the application in the second mode using the second asymmetric core, and enabling the interrupts.

In another feature, the computer program further comprises generating a second control signal based on at least one of core utilization, resource utilization, and performance of the application.

In another feature, the computer program further comprises initiating a core change sequence (CCS) based on the second control signal and switching execution of the application between one of the first and second asymmetric cores and another of the first and second asymmetric cores based on the CCS using the core switching module.

In other features, the computer program further comprises initiating the CCS when the core utilization of the second asymmetric core by the application is greater than or equal to a first predetermined threshold. The computer program further comprises initiating the CCS when the core utilization of the second asymmetric core by the application is greater than or equal to a second predetermined threshold for a first predetermined time period. The computer program further comprises initiating the CCS when the core utilization of the first asymmetric core by the application is less than or equal to a third predetermined threshold. The computer program further comprises initiating the CCS when the core utilization of the first asymmetric core by the application is less than or equal to a fourth predetermined threshold for a first predetermined time period.

In another feature, the computer program further comprises determining an anticipated core utilization based on at least one of a type of the application and a history of execution of the application and initiating the CCS when the anticipated core utilization of the second asymmetric core is greater than or equal to a predetermined threshold.

In another feature, the computer program further comprises initiating the CCS based on at least one of a number of applications executed by one of the first and second asymmetric cores, a type of the application executed by one of the first and second asymmetric cores, and a type of instruction executed by one of the first and second asymmetric cores.

In another feature, the computer program further comprises generating the second control signal based on a number of times execution of applications is switched between one of the first and second asymmetric cores and another of the first and second asymmetric cores.

In another feature, the computer program further comprises controlling power consumption, generating a third control signal based on the second control signal and the power consumption, initiating a core change sequence (CCS) based on the third control signal, and switching execution of the application between one of the first and second asymmetric cores and another of the first and second asymmetric cores based on the CCS using the core switching module.

In another feature, the computer program further comprises initiating a frequency change sequence (FCS) based on the second control signal and selecting an operating frequency of at least one of the first and second asymmetric cores based on the FCS.

In another feature, the computer program further comprises initiating a voltage change sequence (VCS) based on the second control signal and selecting a supply voltage of at least one of the first and second asymmetric cores based on the VCS.

In another feature, the computer program further comprises providing a plurality of the first asymmetric core, and selectively activating and deactivating more than one of the plurality of the first asymmetric core based on the CCS when operating in the first mode using the core switching module.

In another feature, the computer program further comprises providing a glue logic module, selectively communicating with the core switching module using the glue logic module, receiving interrupts via the glue logic module, receiving first signals from the application via the glue logic module, and routing the interrupts and the first signals to the one of the first and second asymmetric cores activated by the core switching module using the glue logic module.

In still other features, a core switching system comprises a mode switching module, a core activation module, and a state transfer module. The mode switching module receives a switch signal to switch operation between a first mode and a second mode. During the first mode, instructions associated with applications are executed by a first asymmetric core, and a second asymmetric core is inactive. During the second mode, the instructions are executed by the second asymmetric core, and the first asymmetric core is inactive. The core activation module stops processing of the applications by the first asymmetric core after interrupts are disabled. The state transfer module transfers a state of the first asymmetric core to the second asymmetric core. The core activation module allows the second asymmetric core to resume execution of the instructions and enables the interrupts.

In another feature, the second asymmetric core executes the instructions without instruction translation when the second asymmetric core resumes executing the instructions during the second mode.

In another feature, a first maximum speed and a first maximum operating power level of the first asymmetric core are greater than a second maximum speed and a second maximum operating power level of the second asymmetric core, respectively.

In another feature, the core activation module supplies one of no power and standby power to the first asymmetric core when the second asymmetric core resumes execution of the instructions.

In other features, the core switching system further comprises a core profile module that generates an anticipated instruction execution rate for executing the applications based on at least one of a data cache miss rate, an instruction cache miss rate, and instructions per cycle executed by the first asymmetric core. The core profile module generates the switch signal based on the anticipated instruction execution rate.

In other features, the core switching system further comprises a core change sequence (CCS) module that generates a CCS based on the switch signal. The core activation module powers up one of the first and second asymmetric cores and shuts down another of the first and second asymmetric cores based on the CCS.

In still other features, a device comprises memory and a core switching module. The memory stores an operating system (OS) including a kernel that provides services to applications. The core switching module switches operation between a first mode and a second mode. During the first mode, instructions associated with the applications are executed by a first asymmetric core; and a second asymmetric core is inactive. During the second mode, the instructions are executed by the second asymmetric core, and the first asymmetric core is inactive. The core switching module operates at a level above the kernel.

In another feature, the core switching module switches between the first mode and the second mode transparently to the OS.

In other features, the core switching module comprises a mode switching module, a core activation module, and a state transfer module. The mode switching module receives a switch signal to switch operation between the first mode and the second mode. The core activation module stops processing of the applications by the first asymmetric core after interrupts are disabled. The state transfer module transfers a state of the first asymmetric core to the second asymmetric core. The core activation module allows the second asymmetric core to resume execution of the instructions and enables the interrupts.

In another feature, instructions are executed without instruction translation when the second asymmetric core resumes executing the instructions during the second mode.

In another feature, a first maximum speed and a first maximum operating power level of the first asymmetric core are greater than a second maximum speed and a second maximum operating power level of the second asymmetric core, respectively.

In another feature, the core switching module supplies one of no power and standby power to the first asymmetric core when the second asymmetric core resumes execution of the instructions.

In other features, the core switching system further comprises a core profile module that generates an anticipated instruction execution rate for executing the applications based on at least one of a data cache miss rate, an instruction cache miss rate, and instructions per cycle executed by the first asymmetric core. The core switching module switches operation between one of the first and second modes and another of the first and second modes based on the anticipated instruction execution rate.

In other features, the core switching system further comprises a core change sequence (CCS) module that generates a CCS based on at least one of a data cache miss rate, an instruction cache miss rate, and instructions per cycle executed by one of the first and second asymmetric cores. The core switching module powers up one of the first and second asymmetric cores and shuts down another of the first and second asymmetric cores based on the CCS.

In still other features, a method comprises executing instructions associated with applications using a first asymmetric core when a second asymmetric core is inactive during a first mode and executing the instructions using the second asymmetric core when the first asymmetric core is inactive during a second mode. The method further comprises receiving a switch signal to switch operation between the first mode and the second mode. The method further comprises disabling interrupts during the first mode based on the switch signal. The method further comprises stopping processing of the applications by the first asymmetric core after interrupts are disabled. The method further comprises transferring a state of the first asymmetric core to the second asymmetric core, allowing the second asymmetric core to resume execution of the instructions and enabling the interrupts.

In another feature, the method further comprises executing the instructions without instruction translation when the second asymmetric core resumes executing the instructions.

In other features, the method further comprises providing the first asymmetric core having a first maximum speed and a first maximum operating power level and providing the second asymmetric core having a second maximum speed and a second maximum operating power level. The first maximum speed and the first maximum operating power level are greater than the second maximum speed and the second maximum operating power level, respectively.

In another feature, the method further comprises supplying one of no power and standby power to the first asymmetric core when the second asymmetric core resumes execution of the instructions.

In other features, the method further comprises generating an anticipated instruction execution rate for executing the applications based on at least one of a data cache miss rate, an instruction cache miss rate, and instructions per cycle executed by the first asymmetric core. The method further comprises generating the switch signal based on the anticipated instruction execution rate.

In another feature, the method further comprises generating a core change sequence (CCS) based on the switch signal, powering up one of the first and second asymmetric cores based on the CCS, and shutting down another of the first and second asymmetric cores based on the CCS.

In still other features, a method comprises storing an operating system (OS) including a kernel that provides services to applications and executing instructions associated with the applications using a first asymmetric core when a second asymmetric core is inactive during a first mode. The method further comprises executing the instructions using the second asymmetric core when the first asymmetric core is inactive during a second mode. The method further comprises switching operation between the first mode and the second mode using a core switching module and executing the core switching module at a level above the kernel.

In another feature, the method further comprises switching between the first mode and the second mode transparently to the OS.

In another feature, the method further comprises receiving a switch signal to switch operation between the first mode and the second mode, stopping processing of the applications by the first asymmetric core after interrupts are disabled, transferring a state of the first asymmetric core to the second asymmetric core, allowing the second asymmetric core to resume execution of the instructions and enabling the interrupts.

In another feature, the method further comprises executing the instructions without instruction translation when the second asymmetric core resumes executing the instructions during the second mode.

In other features, the method further comprises providing the first asymmetric core having a first maximum speed and a first maximum operating power level and providing the second asymmetric core having a second maximum speed and a second maximum operating power level. The first maximum speed and the first maximum operating power level are greater than the second maximum speed and the second maximum operating power level, respectively.

In another feature, the method further comprises supplying one of no power and standby power to the first asymmetric core when the second asymmetric core resumes execution of the instructions.

In other features, the method further comprises generating an anticipated instruction execution rate for executing the applications based on at least one of a data cache miss rate, an instruction cache miss rate, and instructions per cycle executed by the first asymmetric core. The method further comprises switching operation between one of the first and second modes and another of the first and second modes based on the anticipated instruction execution rate.

In another feature, the method further comprises generating a core change sequence (CCS) based on at least one of a data cache miss rate, an instruction cache miss rate, and instructions per cycle executed by the first asymmetric core, powering up one of the first and second asymmetric cores based on the CCS, and shutting down another of the first and second asymmetric cores based on the CCS.

In still other features, a core switching system comprises mode switching means for switching operating modes. The mode switching means receives a switch signal to switch between a first mode and a second mode. During the first mode, instructions associated with applications are executed by first asymmetric core means for executing the instructions, and second asymmetric core means for executing the instructions is inactive. During the second mode, the instructions are executed by the second asymmetric core means, and the first asymmetric core means is inactive. The system further comprises core activation means for activating the first and second asymmetric core means. The core activation means stops processing of the applications by the first asymmetric core means after interrupts are disabled. The system further comprises state transfer means for transferring a state of the first asymmetric core means to the second asymmetric core means. The core activation means allows the second asymmetric core means to resume execution of the instructions and enables the interrupts.

In another feature, the instructions are executed without instruction translation when the second asymmetric core means resumes executing the instructions during the second mode.

In another feature, a first maximum speed and a first maximum operating power level of the first asymmetric core means are greater than a second maximum speed and a second maximum operating power level of the second asymmetric core means, respectively.

In another feature, the core activation means supplies one of no power and standby power to the first asymmetric core means when the second asymmetric core means resumes execution of the instructions.

In another feature, the core switching system further comprises core profile means for generating an anticipated instruction execution rate for executing the applications based on at least one of a data cache miss rate, an instruction cache miss rate, and instructions per cycle executed by the first asymmetric core means, and for generating the switch signal based on the anticipated instruction execution rate.

In other features, the core switching system further comprises core change sequence (CCS) means for generating a CCS based on the switch signal. The core activation means powers up one of the first and second asymmetric core means and shuts down another of the first and second asymmetric cores based on the CCS.

In still other features, a device comprises memory that stores an operating system (OS) including a kernel that provides services to applications. The device further comprises core switching means for switching operation between a first mode and a second mode. During the first mode, instructions associated with the applications are executed by first asymmetric core means for executing the applications, and second asymmetric core means for executing the applications is inactive. During the second mode, the instructions are executed by the second asymmetric core means, and the first asymmetric core means is inactive. The core switching means operates at a level above the kernel.

In another feature, the core switching means switches between the first mode and the second mode transparently to the OS.

In other features, the core switching means comprises mode switching means for receiving a switch signal to switch operation between the first mode and the second mode. The core switching means further comprises core activation means for stopping processing of the applications by the first asymmetric core means after interrupts are disabled. The core switching means further comprises state transfer means for transferring a state of the first asymmetric core means to the second asymmetric core means. The core activation means allows the second asymmetric core means to resume execution of the instructions and enables the interrupts.

In another feature, the instructions are executed without instruction translation when the second asymmetric core means resumes executing the instructions during the second mode.

In another feature, a first maximum speed and a first maximum operating power level of the first asymmetric core means are greater than a second maximum speed and a second maximum operating power level of the second asymmetric core means, respectively.

In another feature, the core switching means supplies one of no power and standby power to the first asymmetric core means when the second asymmetric core means resumes execution of the instructions.

In other features, the device further comprises core profile means for generating an anticipated instruction execution rate for executing the applications based on at least one of a data cache miss rate, an instruction cache miss rate, and instructions per cycle executed by the first asymmetric core means. The core switching means switches between one of the first and second modes and another of the first and second modes based on the anticipated instruction execution rate.

In other features, the device further comprises core change sequence (CCS) means for generating a CCS based on at least one of a data cache miss rate, an instruction cache miss rate, and instructions per cycle executed by the first asymmetric core means. The core switching means powers up one of the first and second asymmetric core means and shuts down another of the first and second asymmetric core means based on the CCS.

In still other features, a computer program stored on a computer readable medium and executed by a processor comprises executing instructions associated with applications using a first asymmetric core when a second asymmetric core is inactive during a first mode and executing the instructions using the second asymmetric core when the first asymmetric core is inactive during a second mode. The method further comprises receiving a switch signal to switch operation between the first mode and the second mode. The method further comprises disabling interrupts during the first mode based on the switch signal. The method further comprises stopping processing of the applications by the first asymmetric core after interrupts are disabled. The method further comprises transferring a state of the first asymmetric core to the second asymmetric core, allowing the second asymmetric core to resume execution of the instructions and enabling the interrupts.

In another feature, the computer program further comprises executing the instructions using without instruction translation when the second asymmetric core resumes executing the instructions during the second mode.

In other features, the computer program further comprises providing the first asymmetric core having a first maximum speed and a first maximum operating power level and providing the second asymmetric core having a second maximum speed and a second maximum operating power level. The first maximum speed and the first maximum operating power level are greater than the second maximum speed and the second maximum operating power level, respectively.

In another feature, the computer program further comprises supplying one of no power and standby power to the first asymmetric core when the second asymmetric core resumes execution of the instructions.

In other features, the computer program further comprises generating an anticipated instruction execution rate for executing the applications based on at least one of a data cache miss rate, an instruction cache miss rate, and instructions per cycle executed by the first asymmetric core. The computer program further comprises generating the switch signal based on the anticipated instruction execution rate.

In another feature, the computer program further comprises generating a core change sequence (CCS) based on the switch signal, powering up one of the first and second asymmetric cores based on the CCS, and shutting down another of the first and second asymmetric cores based on the CCS.

In still other features, a computer program stored on a computer readable medium and executed by a processor comprises storing an operating system (OS) including a kernel that provides services to applications and executing instructions associated with the applications using a first asymmetric core when a second asymmetric core is inactive during a first mode. The method further comprises executing the instructions using the second asymmetric core when the first asymmetric core is inactive during a second mode. The method further comprises switching operation between the first mode and the second mode using a core switching module and executing the core switching module at a level above the kernel.

In another feature, the computer program further comprises switching between the first mode and the second mode transparently to the OS.

In another feature, the computer program further comprises receiving a switch signal to switch operation between the first mode and the second mode, stopping processing of the applications by the first asymmetric core after interrupts are disabled, transferring a state of the first asymmetric core to the second asymmetric core, allowing the second asymmetric core to resume execution of the instructions and enabling the interrupts.

In another feature, the computer program further comprises executing the instructions without instruction translation when the second asymmetric core resumes executing the instructions during the second mode.

In other features, the computer program further comprises providing the first asymmetric core having a first maximum speed and a first maximum operating power level and providing the second asymmetric core having a second maximum speed and a second maximum operating power level. The first maximum speed and the first maximum operating power level are greater than the second maximum speed and the second maximum operating power level, respectively.

In another feature, the computer program further comprises supplying one of no power and standby power to the first asymmetric core when the second asymmetric core resumes execution of the instructions.

In other features, the computer program further comprises generating an anticipated instruction execution rate for executing the applications based on at least one of a data cache miss rate, an instruction cache miss rate, and instructions per cycle executed by the first asymmetric core. The computer program further comprises switching operation between one of the first and second modes and another of the first and second modes based on the anticipated instruction execution rate.

In another feature, the computer program further comprises generating a core change sequence (CCS) based on at least one of a data cache miss rate, an instruction cache miss rate, and instructions per cycle executed by the first asymmetric core, powering up one of the first and second asymmetric cores based on the CCS, and shutting down another of the first and second asymmetric cores based on the CCS.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
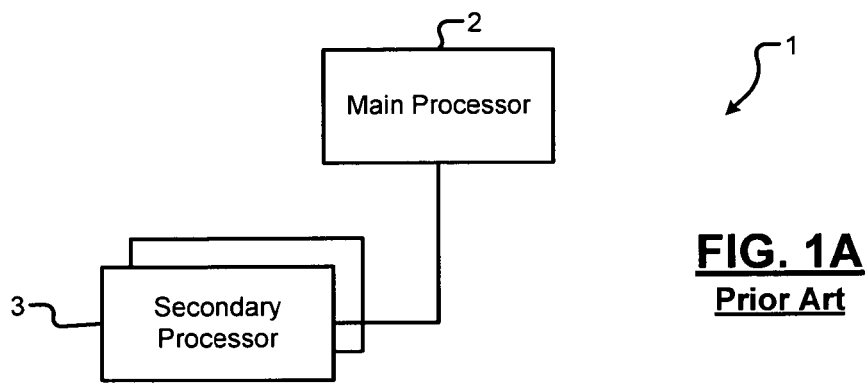
FIG. 1A is a functional block diagram of an asymmetric multiprocessing (MP) system according to the prior art.
Figure 1B:
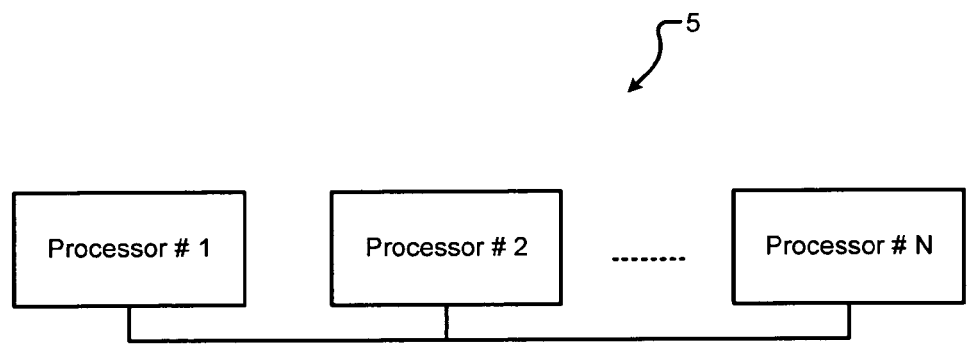
FIG. 1B is a functional block diagram of a symmetric MP system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor or core (shared, dedicated, or group) and memory that execute one or more software or firmware programs, a combinational logic circuit, and/or other suitable components that provide the described functionality.

Most mobile computing devices execute applications that have different levels of complexity and/or processing requirements. Some applications can be efficiently executed using a single-core, low-speed processor while other applications can be efficiently executed using a single-core, high-speed processor. For example only, the low-speed processor may operate at speeds that are less than or equal to 500 MegaHertz (MHz) while the high-speed processor may operate at speeds that are greater than or equal to 1 GigaHertz (GHz). Other speed thresholds may be used.

Most mobile computing devices currently use only one single-core processor. Using the single-core processor to execute all types of applications requires power-performance tradeoffs. For example, using the single-core, low-speed processor may increase power savings and extend battery life at the expense of performance. Some processing-intensive applications may run slowly or not at all. Conversely, using the single-core, high-speed processor may increase performance while reducing battery life since the high-speed processor consumes more power even when executing applications requiring lower processing speed.

According to the present disclosure, both increased power savings and increased performance may be achieved in a mobile device by using a multi-core processing system with a low-speed, low-power (LP) core and a high-speed, high-power (HP) core. The LP core and the HP core may be implemented on the same IC or SOC or as separate ICs that are combined into a system-in-package (SIP). As will be described in further detail below, the multi-core processing system dynamically switches between the LP and HP cores depending on the type of applications being executed, the processing load, and/or other factors described herein.

Figure 2:
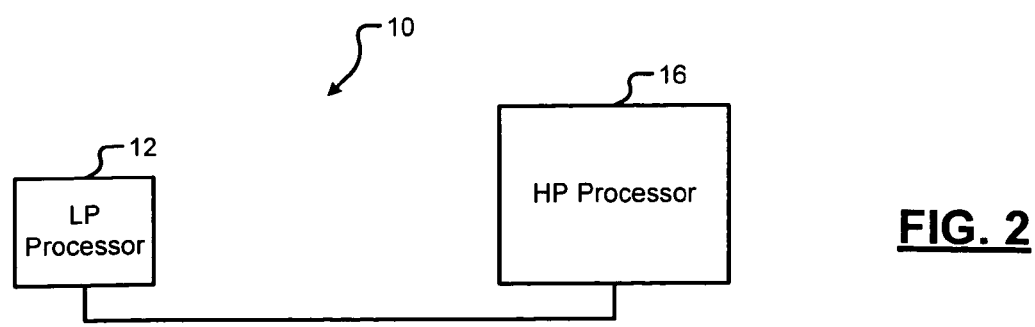
FIG. 2 is a functional block diagram of a symmetric MP system according to the present disclosure.

Referring now to FIG. 2, the mobile device may include an asymmetric multi-processing (MP) system 10 comprising a LP core 12 and a HP core 16. An instruction set architecture (ISA) of the LP core 12 may differ from the ISA of the HP core 16. For example, the HP core 16 may execute floating point instructions while the LP core 12 may not. Additionally, the LP and HP cores (hereinafter cores) 12 and 16 have different performance and capabilities (e.g., different processing speeds, power consumption, etc.). Alternately, both may use the same ISA's According to the present disclosure, the asymmetric MP system 10 is operated in a pseudo-symmetric manner by achieving compatibility between the LP core 12 and the HP core 16. Compatibility between the LP and the HP cores 12 and 16 may be achieved in many ways. For example, the LP and the HP cores 12 and 16 may use the same or similar key core registers/interfaces; the LP core 12 may use register mapping; and/or the LP core 12 may use an instruction set that is the same as or a subset of the instruction set of the HP core 16.

Accordingly, an operating system (OS) and applications can run on both the LP and the HP cores 12 and 16. The asymmetric MP system 10 dynamically switches between the LP and the HP cores 12 and 16 depending on the processing load and the types of applications being executed to increase power savings and improve performance as needed. The asymmetric MP system 10 can be used for general purpose processing (GPP).

The present disclosure uses core morphing to optimize power consumption and improve performance. Core morphing includes adaptive and dynamic switching of cores of MP systems. Specifically, low and high power cores are switched securely and transparently to the OS and/or the applications. In other words, the OS and applications may be unaware of which core is currently executing the processing load.

Core morphing can optimize battery life and performance. For example, battery life can be extended using the LP core to run applications when the processing load is low. On the other hand, high performance can be provided using the HP core to run applications when the processing load is high. Both power consumption and performance can be optimized by dynamically switching between the LP and the HP cores as needed.

In core morphing, cores are dynamically enabled (i.e., activated) or disabled (i.e., deactivated) based on the system load. The system load may be partly determined based on resource utilization and performance demanded by the applications. In some implementations, only one core may be active (i.e., executing applications) at a time. When one core is active, other cores may be disabled (i.e., deactivated) to save power. The other cores may be disabled in many ways. For example, the other cores may be put in a standby mode wherein the clock frequency and/or the supply voltage of the other cores may be decreased to values that are lower than when the cores are active. Alternatively, the other cores may be completely shut down by disconnecting the power supply to the cores.

When execution is switched from one core to another, the active core may transparently run the OS and applications. Specifically, when execution is switched from one core to another, the other core executes instructions without translation. Accordingly, the switching of cores is transparent or invisible to the OS and applications, which continue to run as if the system comprises a single core instead of multiple cores. Core morphing may be used in multi-core systems comprising one LP core and one HP core. When applications demand still higher performance than that provided by one HP core, multiple HP cores may be used.

Although dynamic core switching is discussed throughout the disclosure using mobile computing devices as an example, the dynamic core switching can be used in other computing systems including desktop computers, servers, etc. to reduce power consumption.

Figure 3A:
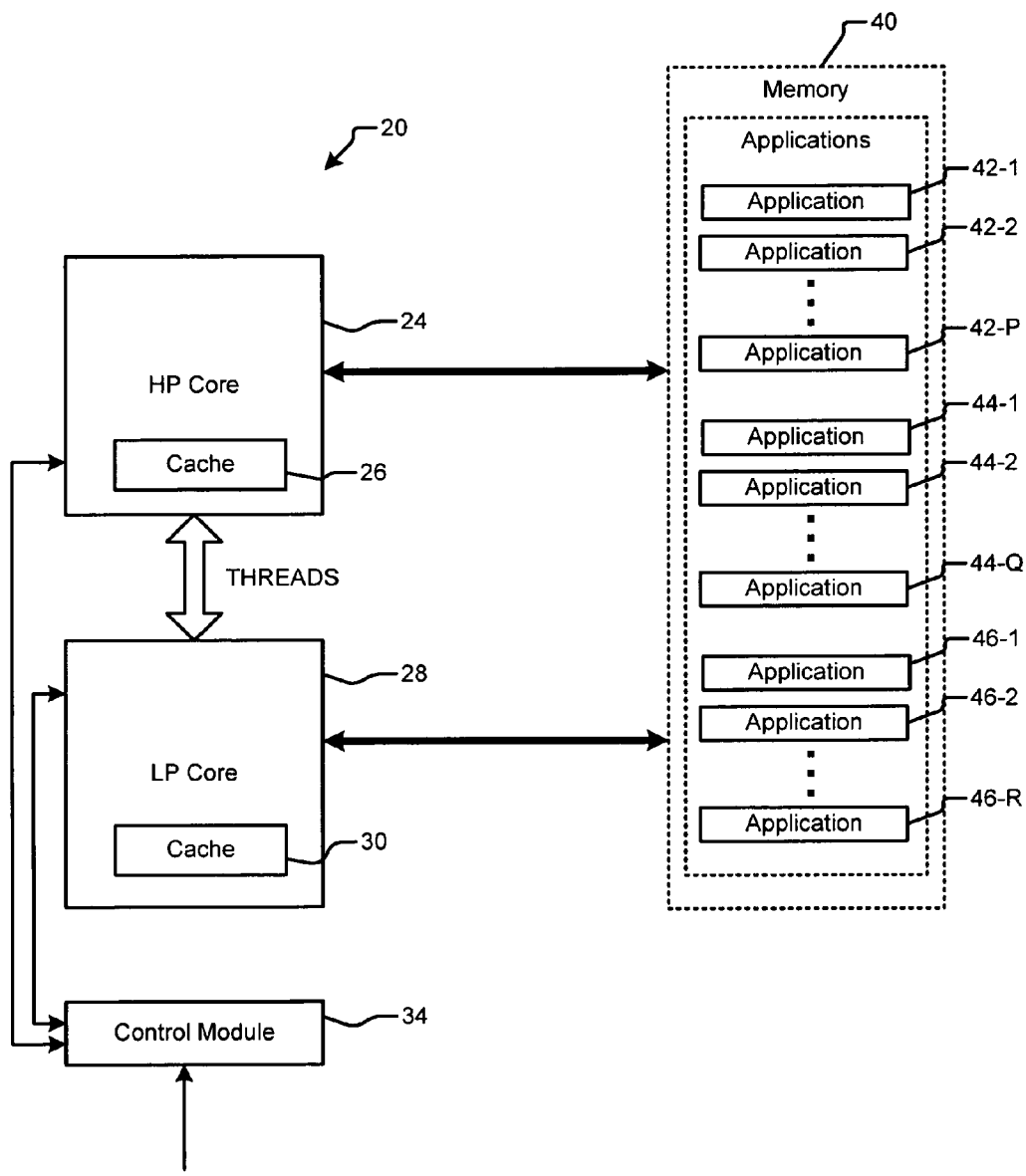
FIGS. 3A and 3B are functional block diagrams of an exemplary processing system including a high power core and a low power core according to the present disclosure.
Figure 3B:
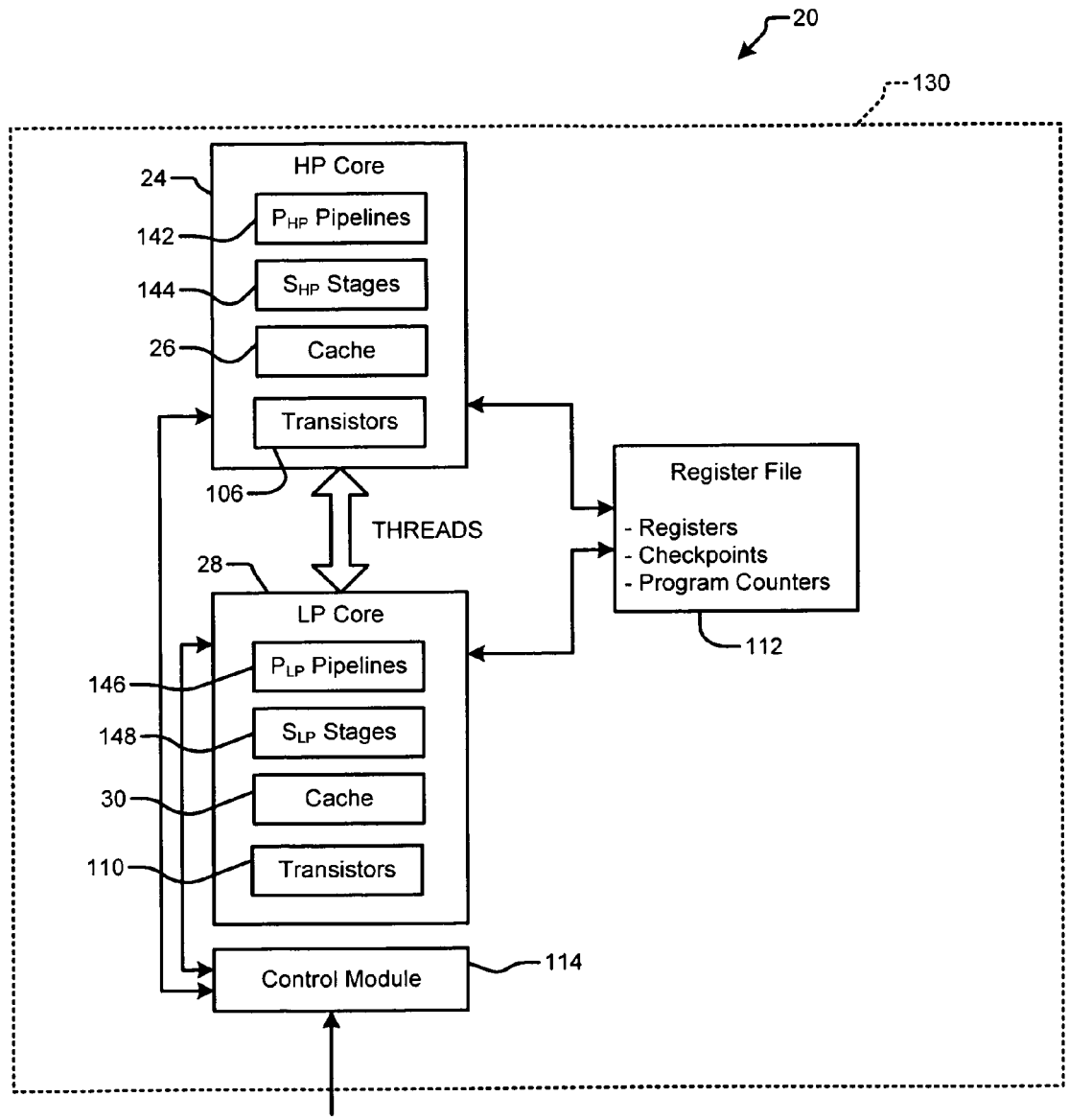
Figure 3C:
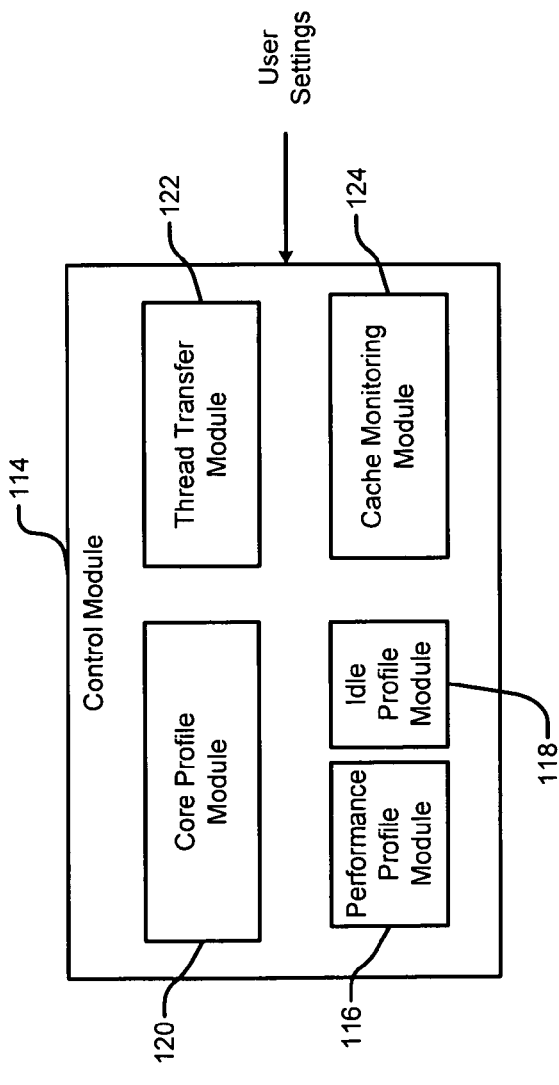
FIG. 3C is a functional block diagram of an exemplary control module of FIGS. 2A and 2B.
Figure 3D:
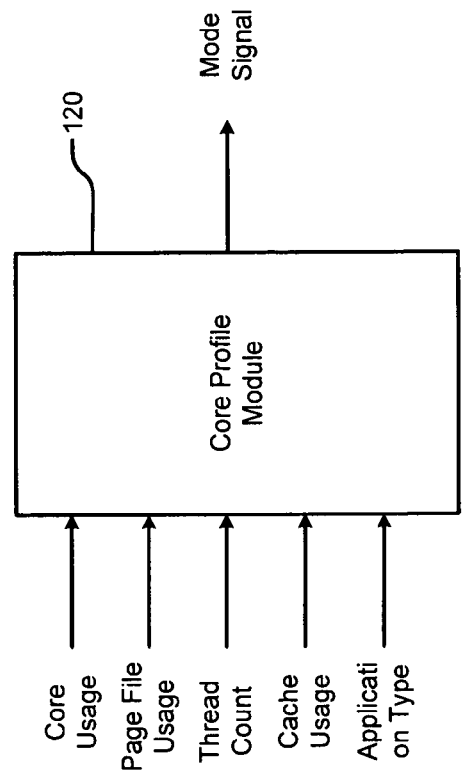
FIG. 3D is a functional block diagram of an exemplary core utilization monitoring module of FIG. 3A.
Figure 4:
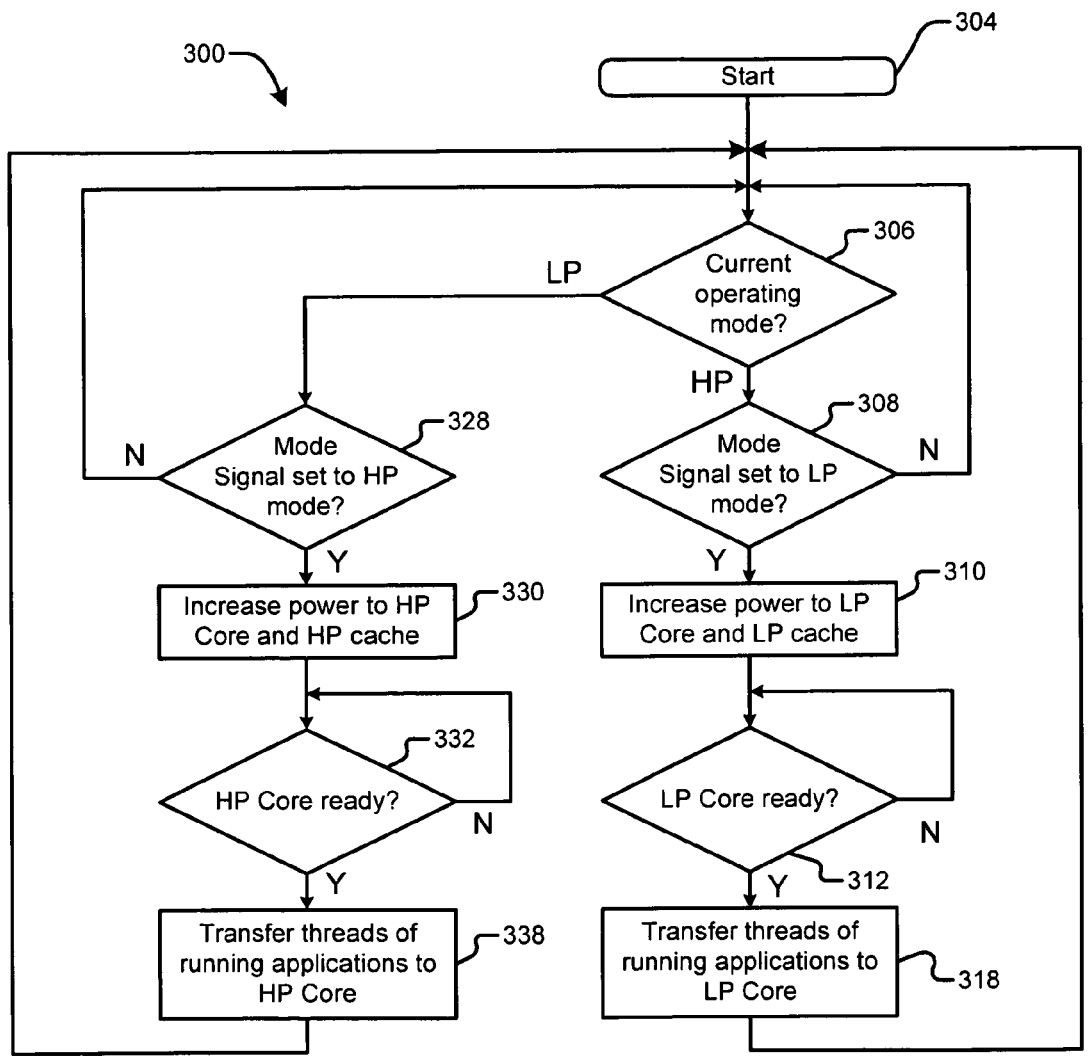
FIG. 4 is a flowchart of an exemplary method for operating a processing system including high power and low power cores.
Figure 5:
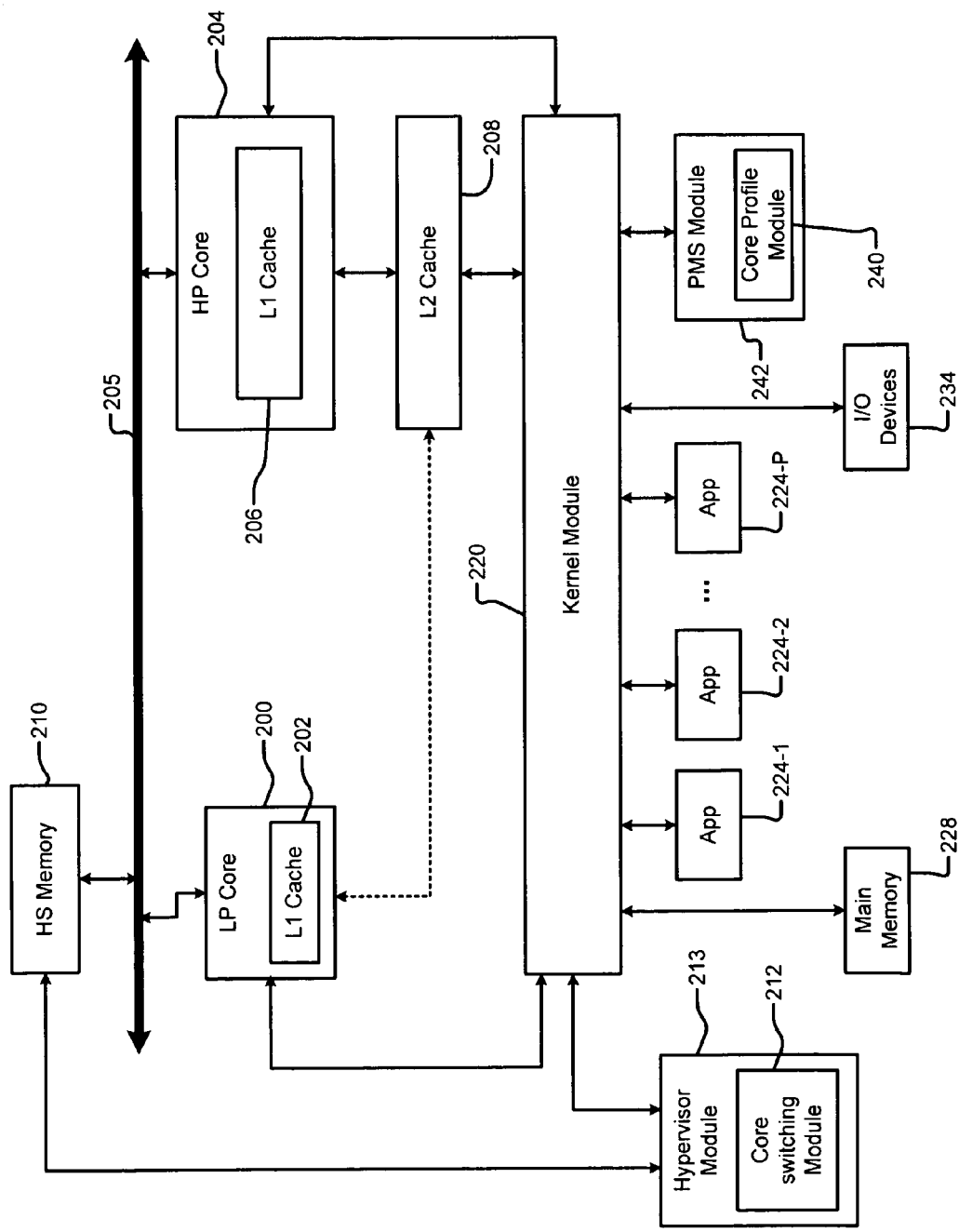
FIG. 5 is a functional block diagram of another exemplary control module with first and second cores.
Figure 6:
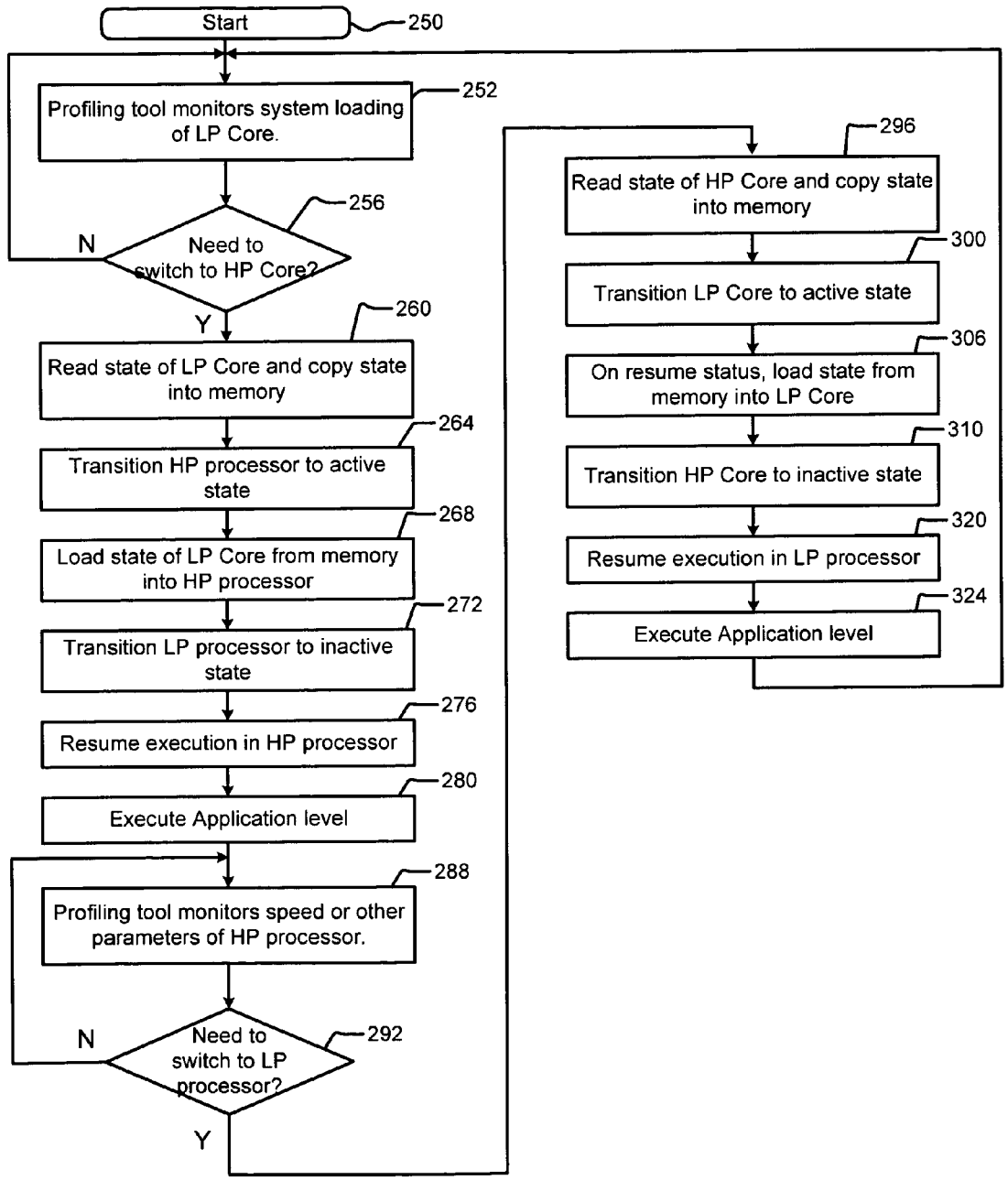
FIG. 6 is a flowchart of an exemplary method for operating the first and second cores of FIG. 5.
Figure 7:
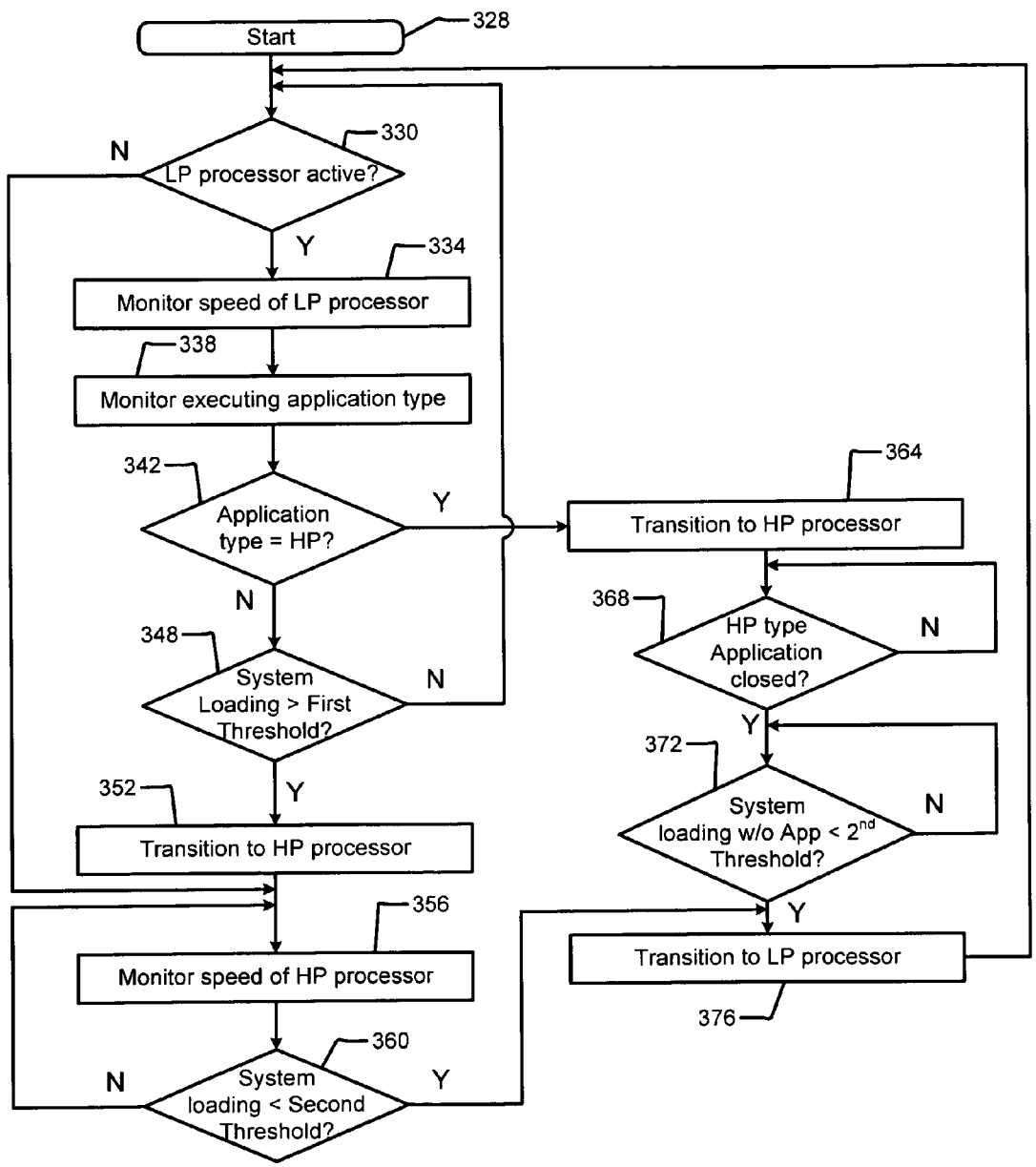
FIG. 7 is a flowchart of another exemplary another method for operating the first and second cores of FIG. 5.
Figure 8A:
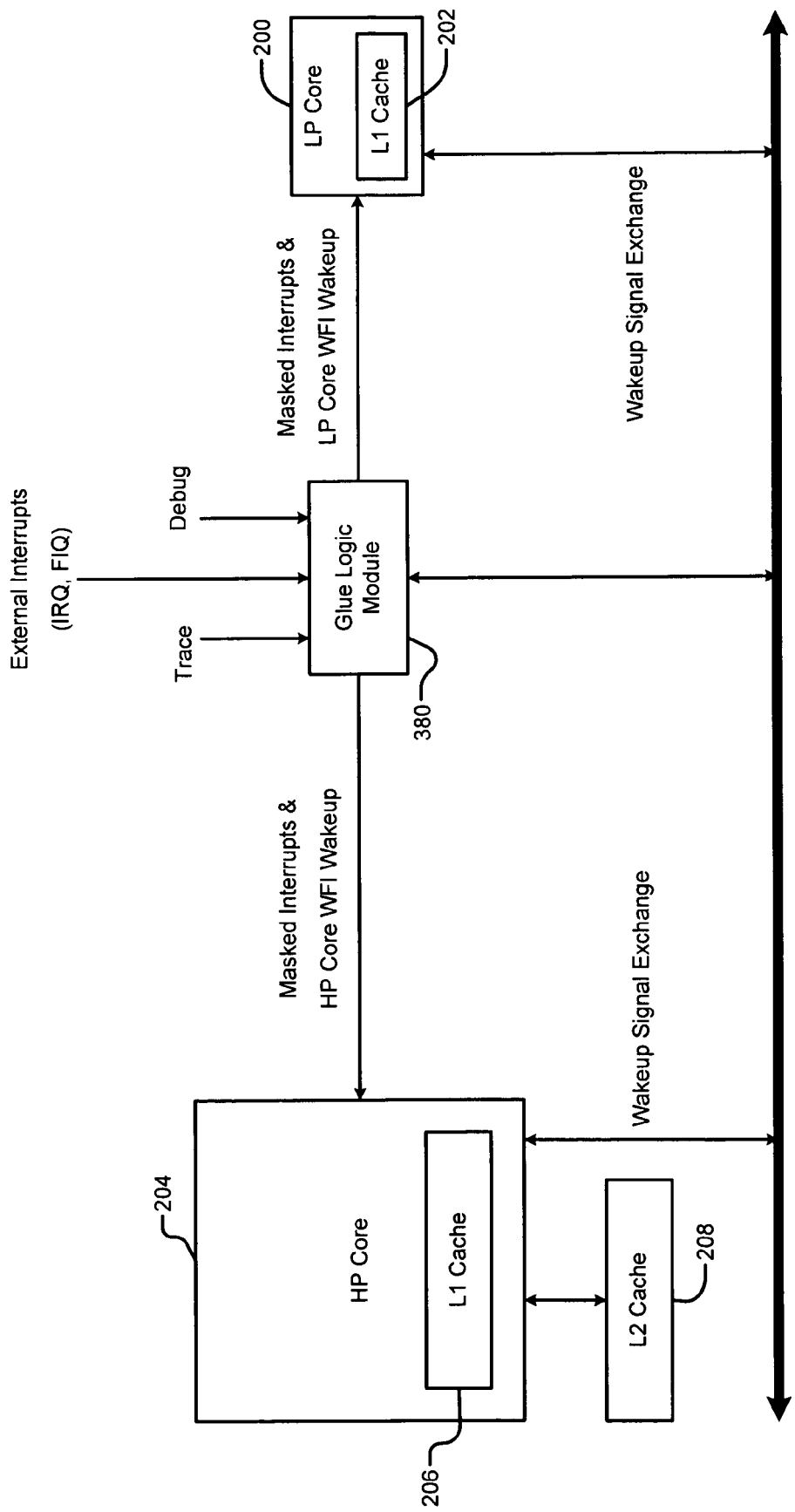
FIGS. 8A and 8B are functional block diagrams of an exemplary core morphing system according to the present disclosure.
Figure 8B:
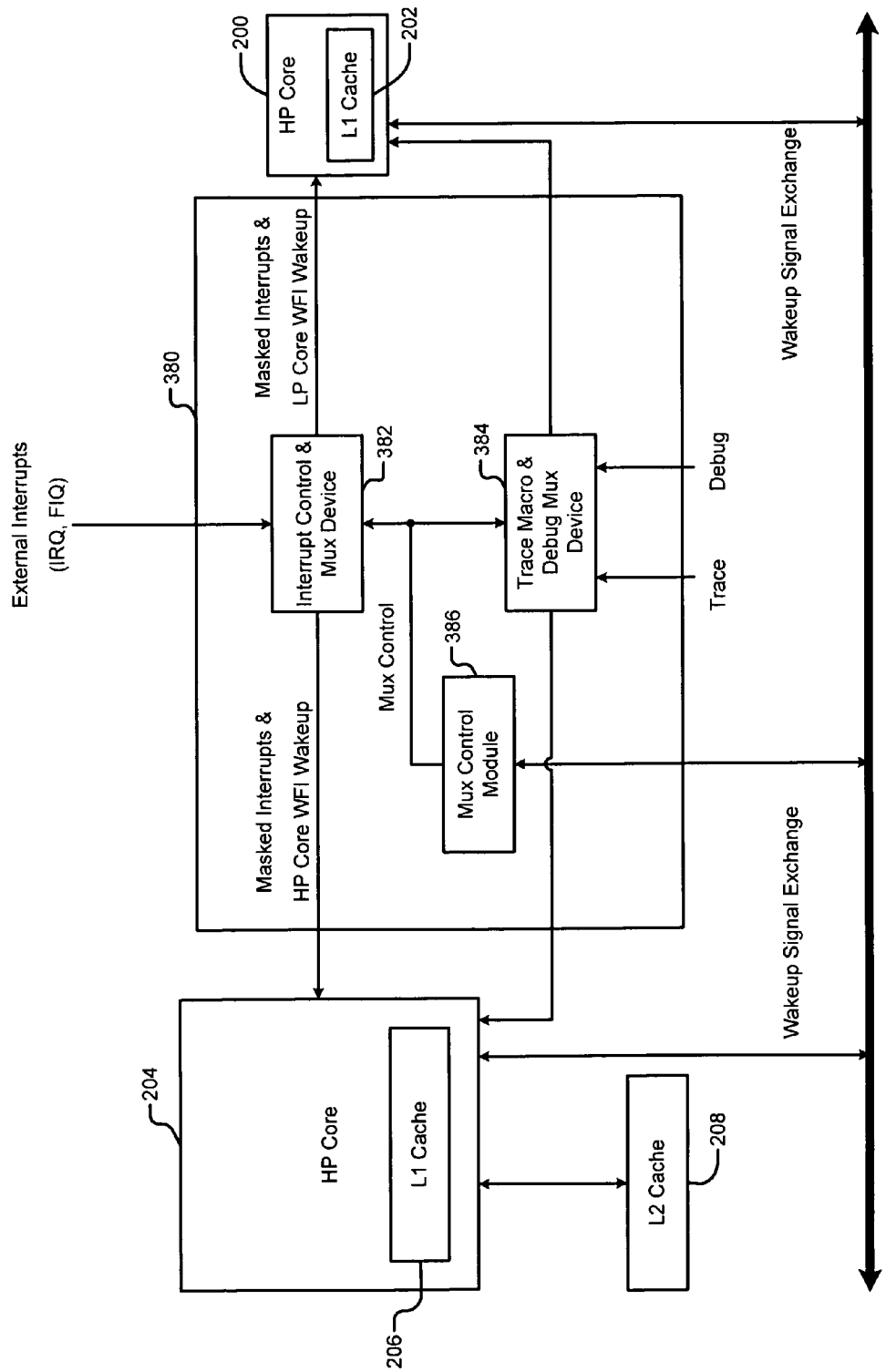
Figure 9A:
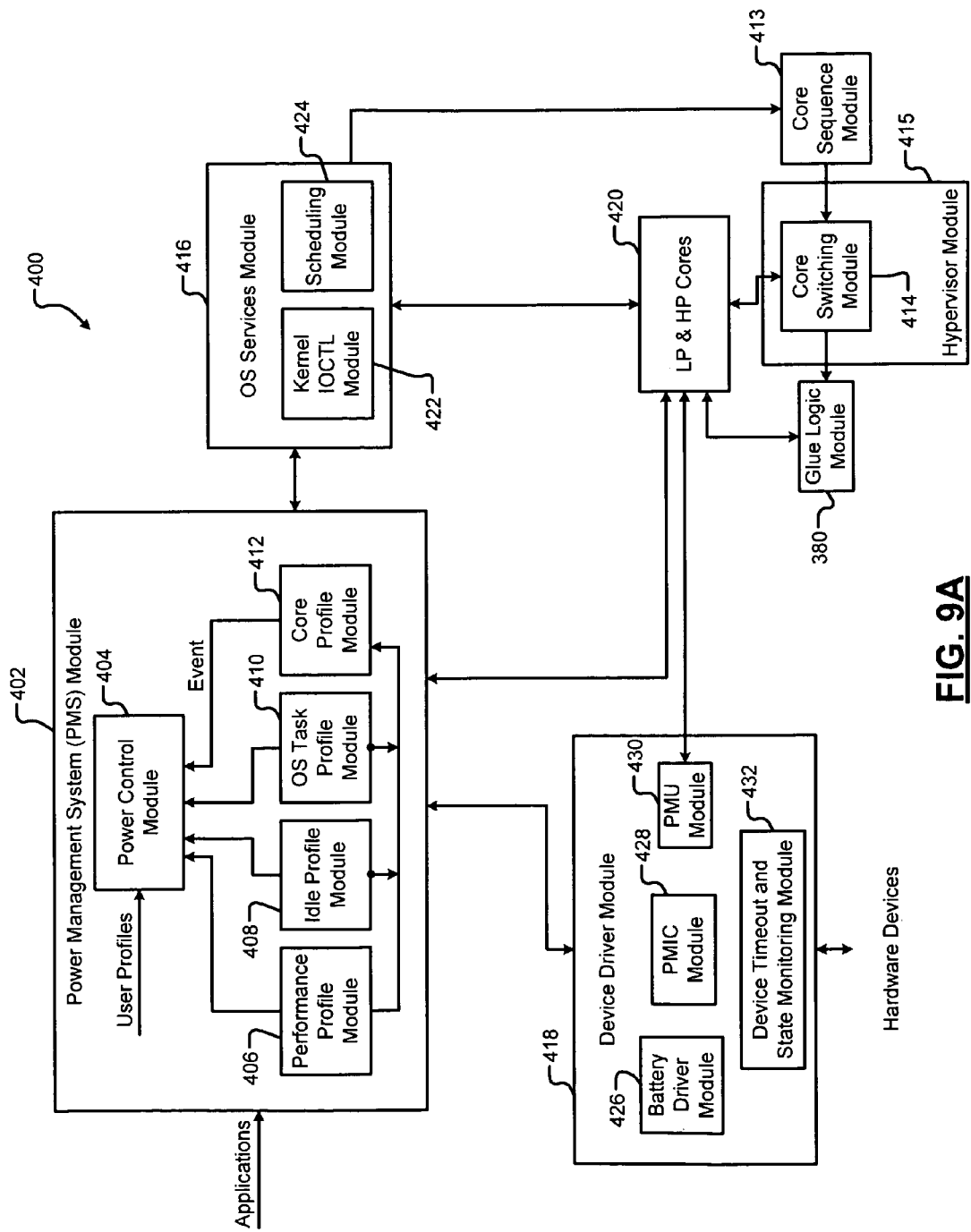
FIG. 9A is a functional block diagrams of an exemplary power management system that dynamically switches cores according to the present disclosure.
Figure 9B:
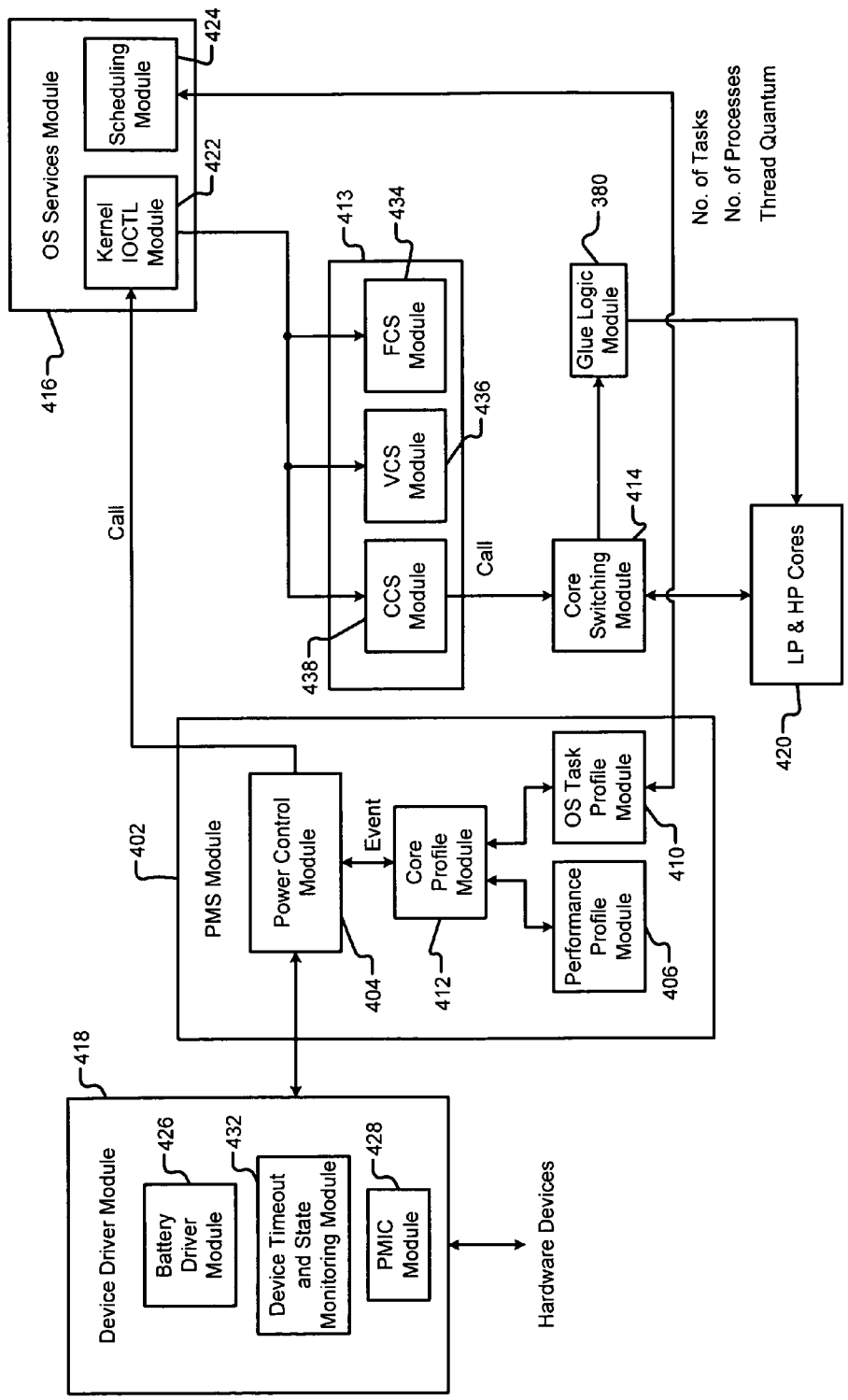
FIG. 9B is a functional block diagrams of another exemplary power management system that dynamically switches cores according to the present disclosure.
Figure 9C:
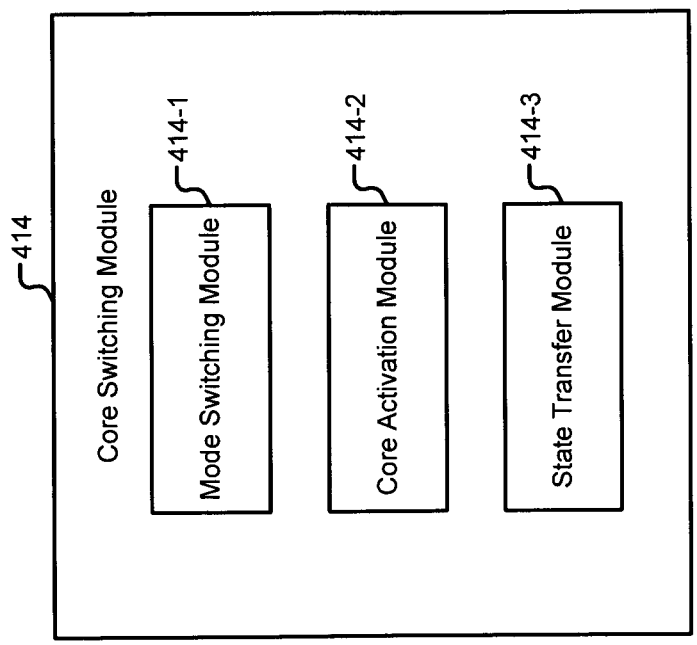
FIG. 9C is a functional block diagram of an exemplary core switching module.
Figure 10:
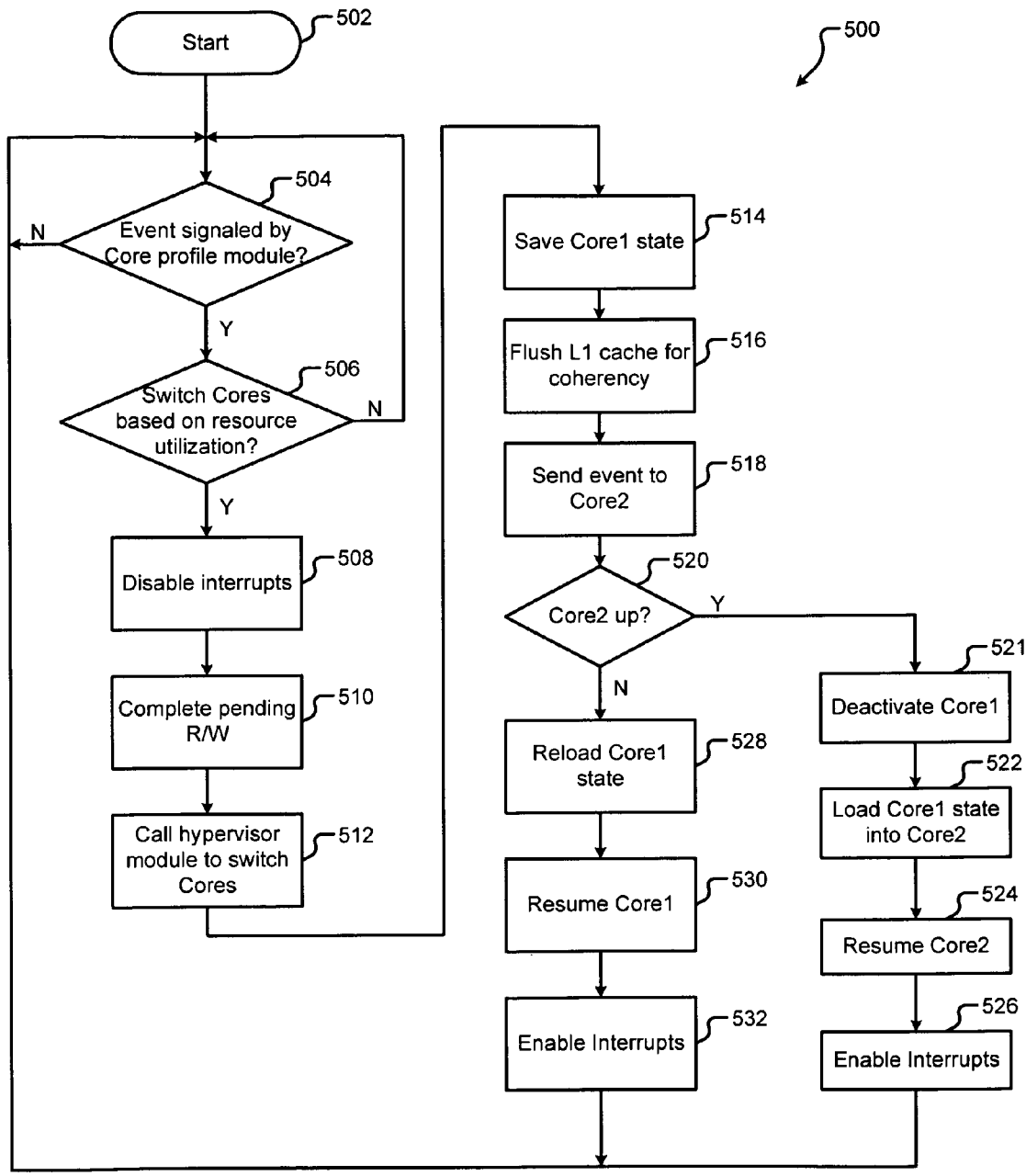
FIG. 10 is a flowchart of an exemplary method for switching cores using a core switching module integrated with a hypervisor module according to the present disclosure.

Before a detailed discussion, a brief overview of the figures is presented. FIGS. 3A and 3B show a multi-core processing system having a LP core and a HP core. FIG. 3C shows a control module that switches cores of the multi-core processing system. FIG. 3D shows a core utilization module of the control module. FIG. 4 illustrates a method for operating the multi-core processing system. FIG. 5 shows another system for switching cores of a multi-core processing system. FIGS. 6 and 7 illustrate methods for operating the multi-core processing system. FIGS. 8A and 8B show a glue logic module that operates one core when cores are switched during core morphing. FIG. 9A shows a power management system that uses a core switching module to dynamically switch cores. FIG. 9B shows a power management system that uses a core switching module to dynamically switch cores. FIG. 9C shows an exemplary core switching module. FIG. 10 shows steps of a method for dynamically switching cores using the core switching module.

Referring now to FIG. 3A, a processing system 20 according to the present disclosure is shown. The processing system 20 includes a HP core 24 with cache 26 and a LP core 28 with cache 30. The processing system 20 can switch between the HP and LP cores 24 and 28 to reduce power consumption while still supporting processing at high speed as needed. The processing system 20 may be useful in extending battery life in mobile devices that operate on battery power. Both HP and LP cores 24 and 28 are capable of running the same operating system and/or applications. Additionally, both HP and LP cores 24 and 28 can execute instructions, states, and/or threads of each other and continue processing.

In the HP mode, the HP core 24 is in the active state and processes threads. The LP core 28 may also operate during the HP mode. In other words, the LP core 28 may be in the active state during all or part of the HP mode. To reduce power, however, the LP core 28 may be operated in the inactive state while the HP core 24 is in the active state.

In the LP mode, the LP core 28 operates in the active state and processes threads and the HP core 24 is in the inactive state. The inactive core may be completely turned off (no power supplied). Alternatively, standby power, which includes lower power levels than active power levels, may be supplied to the core in the inactive state to allow quicker transitions to the active state.

The HP and LP cores 24 and 28 may use the same or a similar operating system. The LP core 28 may use an ISA that is the same as or a subset of the ISA of the HP core 24. The HP and LP cores 24 and 28 may be capable of running the same code and/or applications, albeit at different speeds. The HP and LP cores 24 and 28 may have the same or a similar architecture. The HP core 24 may have more processing capabilities (e.g., pipelines, stages, etc.) than the LP core 28. Both HP and LP cores 24 and 28 may temporarily operate in the active state at the same time when transitioning from the LP mode to the HP mode and from the HP mode to the LP mode.

Memory 40 such as volatile and/or non-volatile memory stores first applications 42-1, 42-2, ..., and 42-P (collectively first applications 42), second applications 44-1, 44-2, ..., and 44-Q (collectively second applications 44), and/or third applications 46-1, 46-2, ..., and 46-R (collectively third applications 46), where P, Q and R are integers greater than zero. The first applications 42 may include applications that require relatively low processing speed during operation and may be executed during LP or HP modes. In other words, the first applications 42 may comprise applications that are generally not very processor intensive. However, if a sufficient number of the first applications 42 are being executed concurrently, the processing system 20 may need to transition to and operate in the HP mode.

The second applications 44 may comprise applications that require medium processing speed (e.g., typically higher than the first applications 42 and lower than the third applications 46 on average). Depending upon the circumstances, the second applications 44 may require low, medium, or high processing speed. The third applications 46 may be applications that tend to require high processing speed and may be best operated in the HP mode. Both HP and LP cores 24 and 28 may be capable of running all three types of applications. Alternately, some applications may be limited to running using only the HP core 24.

A control module 34 may be provided to selectively control transitions between the HP and LP modes. The control module 34 may receive a mode change request signal from another module or device. The control module 34 may monitor the transfer of instructions, states, threads, and/or information relating to the transfer such as registers, states, checkpoints, and/or program counters. Once the transfer is complete, the control module 34 may transition one of the HP and LP cores 24 and 28 to the inactive state.

The processing system 20 may be packaged in a variety of ways. For example, both the HP and LP cores 24 and 28 of the processing system 20 may optionally be implemented as a system on chip (SOC). Alternately, the processing system 20 may be packaged as multiple chips arranged as a system-in-package (SIP) or arranged on a printed circuit board (PCB). Still other packaging methods are contemplated.

Referring now to FIG. 3B, the processing system 20 includes the HP core 24, the LP core 28, a shared register file 112, and a control module 114. The HP core 24 may be fabricated using a high leakage/high speed process. The LP core 28 may be fabricated using a low leakage/low speed process. The HP and LP cores 24 and 28 include transistors 106 and 110, respectively. The transistors 106 of the HP core 24 tend to consume more power during operation in the active state than the transistors 110 of the LP core 28. In some implementations, the transistors 106 may have higher leakage current than the transistors 110. The transistors 106 may have a size that is greater than a size of the transistors 110. Gates of the transistors 106 may be larger than gates of the transistors 110. A gate count of the HP core 24 may be greater than the gate count of the LP core 28.

The HP core 24 may have a more complex architecture than the LP core 28. For example, the LP core 28 may have a smaller width and/or depth than the HP core 24. The width may be defined by the number of parallel pipelines. The HP core 24 may include $P_{HP}$ parallel pipelines 142 and the LP core 28 may include $P_{LP}$ parallel pipelines 146. In some implementations, $P_{LP}$ may be less than $P_{HP}$. $P_{LP}$ may be an integer greater than or equal to zero. When $P_{LP}$=0, the LP core 28 does not include any parallel pipelines. The depth may be defined by the number of stages. The HP core 24 may include $S_{HP}$ stages 144 and the LP core 28 may include $S_{LP}$ stages 148. In some implementations, $S_{LP}$ may be less than $S_{HP}$. $S_{LP}$ may be an integer greater than or equal to one.

The register file 112 may be shared between the HP core 24 and the LP core 28. Alternatively, each of the HP and the LP cores 24 and 28 may have a register file. The contents of the register file 112 may be transferred from an active core that is soon to be deactivated to the inactive core that is soon to be activated. The register file 112 may use predetermined address locations for registers, checkpoints, and/or program counters. For example, registers, checkpoints, and/or program counters that are used by the HP and/or LP cores 24 and/or 28, respectively, may be stored in the same locations in register file 112. Therefore, the HP core 24 and the LP core 28 can locate a particular register, checkpoint, and/or program counter when transitioning from one core to the other core. The register file 112 may be in addition to register files (not shown) in each of the HP and LP cores 24 and 28, respectively. Threading may include single threading and/or multi-threading.

The control module 114 may selectively control transitions between the HP and LP modes. The control module 114 may receive a mode change request signal from another module or device. The control module 114 may monitor the transfer of instructions, states, threads, and/or information relating to the transfer such as registers, states, checkpoints, and/or program counters. Once the transfer is complete, the control module 114 may transition one of the HP and LP cores 24 and 28 to the inactive state. The HP core 24, the LP core 28, the register file 112, and/or the control module 114 may be implemented as a system on chip (SOC) 130.

The HP core 24 may include cache 26, and the LP core 28 may include cache 30. The cache 26 may be larger in size than the cache 30. The cache 26 may consume more power than the cache 30. For example only, the cache 26 may include four-way cache while the cache 30 may include direct map cache. For example only, the HP core 24 may operate at speeds greater than or equal to 1 GHz while the LP core 28 may operate at speeds less than or equal to 500 MHz.

Referring now to FIG. 3C, the control module 114 may include one or more of the following modules to manage operation of the processing system. The control module 114 may include a performance profile module 116, an idle profile module 118, a core profile module 120, a thread transfer module 122, and/or a cache monitoring module 124.

The performance profile module 116 may monitor the performance of the applications being executed by the HP and the LP cores 24 and 28 and may generate profiles of system loading. Specifically, the performance profile module 116 may dynamically detect the types of workloads (e.g., whether the system load is CPU-bound, memory-bound, or both). Additionally, the performance profile module 116 may detect performance bottlenecks when the clock frequency and/or the supply voltage of the HP and LP cores 24 and 28 are varied.

The idle profile module 118 may monitor CPU utilization and determine a lowest possible clock frequency and/or supply voltage for operating the HP and LP cores 24 and 28. The idle profile module 118 may minimize impact on performance based on workload while saving power for workloads having a high idle duty cycle.

Additionally, the idle profile module 118 may be used to maintain a lower power level in the HP and LP cores 24 and 28 when the HP and LP cores 24 and 28 are inactive, respectively. For example, the idle profile module 118 may operate a power supply to supply a low power level that is lower than an active operating power level (and greater than no power) and that is sufficient to allow the core that is inactive to quickly transition to an active state.

The cache monitoring module 124 may monitor cache miss rates when the HP and LP cores 24 and 28 execute applications. For example, the cache monitoring module 124 may monitor instruction cache miss rate and data cache miss rate of the HP and LP cores 24 and 28.

The core profile module 120 may analyze information generated by the performance profile module 116, the idle profile module 118, and/or the cache monitoring module 124. Based on the information, the core profile module 120 may monitor core utilization of the HP and the LP cores 24 and 28 when the applications are being executed. The core profile module 120 may indicate when the core utilization is at or below certain predetermined thresholds. The core profile module 120 may generate a mode change signal when a switch from the LP mode to the HP mode or from the HP mode to the LP is needed to optimize power consumption and performance. A power management system may utilize the mode change signal in determining whether to change mode as requested.

More specifically, the core profile module 120 may monitor processing speed of the HP and LP cores 24 and 28, respectively. When the HP core 24 begins operating at a first processing speed below a first predetermined threshold, the core profile module 120 may indicate a need to switch operation to the LP core 28. When the LP core 28 begins operating at a second processing speed above a second predetermined threshold, the core profile module 120 may indicate a need to switch operation to the HP core 24.

The first and second predetermined thresholds may be equal or unequal (to provide hysteresis). In other words, the first predetermined threshold may be lower than the second predetermined threshold. The first and second processing speeds may be averaged over first and second periods to prevent switching during momentary changes in the processing speed. The first and second periods can be set to different periods to facilitate or retard switching. The first period, the second period, the first predetermined threshold, and the second predetermined threshold may be preset by programmers or may be used-defined. By doing so, the user may control the power dissipation of the device including the processing system 20. The thread transfer module 122 facilitates transfer of threads between the HP core 24 and the LP core 28 when the cores are switched.

Referring now to FIG. 3D, the core profile module 120 may monitor system loading. For example, one or more core parameters of the HP and LP cores 24 and 28 may be monitored to provide an indication of core utilization. For example, the core profile module 120 may monitor processing speed, page file usage, input/output loading, thread count, cache usage, and/or application type. CPU usage may represent a ratio of the number of operations per unit of time relative to the capacity of the core. Page file usage may represent a ratio of the number of page files relative to the maximum number of page files. Thread count may be the number of active threads.

The core profile module 120 may use a single threshold. In other words, the transition to HP core 24 may occur when the CPU usage of the LP core 28 is above predetermined percentage during a predetermined period, the page file usage is greater than a predetermined number of page files, or the thread count is greater than a predetermined number of threads. The core profile module 120 may also combine criteria into more complex conditions. For example only, the core profile module 120 may require the processing speed of the LP core 28 to be above a predetermined percentage of maximum speed during a predetermined period and the input/output loading to be greater than a predetermined value. Hysteresis may be used as well. Still other combinations are contemplated.

Referring now to FIG. 4, an exemplary method 300 for operating the processing system 20 is shown. Control begins in block 304 and proceeds to block 306. In block 306, control determines a current operating mode. If step 306 is equal to HP, control continues with step 308 and determines whether the mode signal is set to the LP mode. If step 308 is true, control continues with step 310 and increases power to the LP core 28 and the cache 30. In step 312, control determines whether the LP core 28 and the cache 30 are ready. In step 318, control transfers instructions, states, threads, etc. running on the HP core 24 to the LP core 28.

If step 306 is equal to LP, control continues with step 328 and determines whether the mode signal is set to the HP mode. If step 328 is true, control continues with step 330 and increases power to the HP core 24 and the cache 26. In step 332, control determines whether the HP core 24 and the cache 26 are ready. In step 338, control transfers instructions, states, and/or threads running on the LP core 28 to the HP core 24.

Referring now to FIG. 5, another exemplary system with HP and LP cores is shown. The system includes a LP core 200 that includes level one (L1) cache 202 and a HP core 204 that includes L1 cache 206. The LP and HP cores 200 and 204 may communicate via a bus 205. A high-speed memory 210 may be provided. The high-speed memory 210 may comprise static random access memory (SRAM) or other suitable high-speed memory. The LP and HP cores 200 and 204 may be implemented as separate ICs and arranged as a system-in-package (SIP), or integrated as an IC or SOC. The high-speed memory 210 may also be integrated with one or both of the LP and HP cores 200 and 204.

The LP and HP cores 200 and 204 may also have some or all of the attributes described herein. The LP core 200 may have a smaller core than the HP core 204. In addition to the L1 cache 202 and 206, level 2 (L2) cache 208 may also be provided. The L1 cache 202 and 206 may be integrated with the respective LP and HP cores 200 and 204. The L2 cache 208 may be utilized by one or both of the cores 200 and 204. Since the L2 cache 208 generally tends to have high leakage current and/or power consumption, use of the L2 cache may be restricted to the HP core 204 if desired. In some implementations, the HP core 204 may comprise multiple identical cores.

The LP and HP cores 200 and 204 may execute the same operating system (OS) with different ISAs and can execute the same code. A kernel module 220, which is a component of the OS, manages system resources. For example only, the OS may include Linux® or other suitable operating system. The kernel module 220 provides a lowest level abstraction layer for resources (e.g., the high-speed memory 210 or main memory 228, LP and HP cores 200 and 204, and input/output devices 234) that applications 224 (e.g., applications 224-1, 224-2, . . . and 224-P) control when performing their functions. The kernel module 220 typically provides these resources to processes of the applications 224 through inter-process communication mechanisms and system calls.

During boot up, a boot loader typically starts executing the kernel module 220. The kernel module 220 initializes itself and starts a first process. Subsequently, the kernel module 220 generally executes in response to external events such as system calls used by applications 224 to request services from the kernel module 220 or via interrupts used by hardware components to notify the kernel module 220 of events. The kernel module 220 may also execute an idle process loop when no processes are available to run.

A power management system (PMS) module 242 may be provided to manage power consumption and to initiate or control changes in system operation based on the monitored system loading. A core profile module 240 may monitor system loading such as core loading, input/output loading, application loading, and/or loading based on other system operating parameters.

For example, the PMS module 242 may control switching between different operating frequencies of the LP core 200 based on demand. In other words, the PMS module 242 may handle transitions between one of T different operating speeds of the LP core 200, where T is an integer greater than one, based on system loading. For example, under low load conditions, the LP core 200 may initially operate at speeds below 100 MHz. As system loading increases, the PMS module 242 may need to increase operating speed to 200 MHz. As can be appreciated, operation at higher speeds may also be associated with higher power consumption. The increase in speeds may be accomplished by raising supply voltage $V_{dd}$ to the LP core 200 and/or to related clocking circuitry. Additional speed steps may be employed to increase the operating speed of the LP core 200 up to a maximum processing speed thereof.

When the LP core 200 reaches its highest operating speed and additional system loading occurs, the core profile module 240, the PMS module 242, and/or the kernel module 220 disable interrupts and generate a system call to a hypervisor module 213 or a core switching module 212 to trigger a transition. The core switching module 212 may be standalone or may be integrated with the hypervisor module 213. The core switching module 212 may transition (switch) the operation from the LP core 200 to the HP core 204 in response to the system call and return control to the kernel module 220 after the transition (switching) is complete.

The term hypervisor generally refers to a virtualization platform that allows multiple operating systems to run at the same time on a host computer. The hypervisor may be used to safely suspend operation of one OS while the other OS is operating. The hypervisor typically operates above the kernel. Alternatively, the hypervisor may operate below the kernel.

In the present disclosure, the term hypervisor refers to a virtualization platform that allows a host device to use multiple asymmetric processors using the same OS. The hypervisor is operated in a trusted zone in contrast to other user applications that are not in a trusted zone. The trusted zone is a safe environment providing code isolation where services can be executed securely without external interrupts. The hypervisor manages transfers between the processors and suspends operation of one asymmetric processor while the other asymmetric processor operates. Alternatively, the hypervisor may be used to run multiple asymmetric processors using multiple OSs.

Depending on whether the core switching module 212 is integrated in the hypervisor module 213, the hypervisor module 213 or the core switching module 212 is loaded into the high-speed memory 210 from RAM or other storage after boot up. The core switching module 212 switches cores in a trusted zone. The PMS module 242 disables interrupts to one of the LP and HP cores 200 and 204 when operation of one core is suspended and handed over to another core. The hypervisor module 213 and/or the core switching module 212 provide hardware abstraction by isolating the cores from the OS and applications and make switching cores transparent to the OS and applications.

The core switching module 212 executes at a level above the kernel module 220. Since the core switching module 212 switches cores transparently to the OS and applications, the OS and applications can run unaltered when the core switching module 212 switches cores.

After the interrupts are disabled by the PMS module 242, the core switching module 212 copies the state of the LP core 200, activates the HP core 204, and initializes the HP core 204 with the state of the LP core 200. After the HP core 204 is initialized, the core switching module 212 deactivates the LP core 200. The HP core 204 resumes executing the application, and the PMS module 242 enables the interrupts.

After executing instructions using the HP core 204, system loading may eventually decrease. When the system loading decreases to a predetermined point, the core switching module 212 may transition operation from the HP core 204 back to the LP core 200. As can be appreciated, systems employing core switching may benefit from the low power consumption of the LP core 200 when relatively low processing speed is required. When high speed processing is desired, the HP core 204 can be used and then turned off when the processing load decreases sufficiently.

Referring now to FIG. 6, steps of a method for operating the LP and HP cores 200 and 204 of FIG. 5 are shown. Control begins with step 250. In step 252, the core profile module 240 monitors system loading of the LP core 200. In step 256, the core profile module 240 determines whether there is a need to switch to the HP core 204. If step 256 is false, control returns to step 252.

If step 256 is true, a control message is sent to the core switching module 212. The core switching module 212 reads the state (pointers, registers, opcodes, operands, program counters (PC), etc.) of the LP core 200 and copies the state or information representative of the state of the LP core 200 into the high-speed memory 210 in step 260. In step 264, the core switching module 212 transitions the HP core 204 to the active state. The core switching module 212 loads the state of the LP core 200 from the high-speed memory 210 into the HP core 204 in step 268. In step 272, the core switching module 212 transitions the LP core 200 to the inactive state. In step 276, the HP core 204 resumes execution at the state loaded into the HP core 204. In other words, operation resumes at the same program counter value where the LP core 200 entered the inactive state.

In step 280, after completing the instructions loaded from the LP core 200, the HP core 204 may begin executing at the application level. In step 288, the core profile module 240 monitors system loading of the HP core 204. In step 292, the core profile module 240 determines whether there is a need to switch to the LP core 200.

If step 292 is false, control returns to step 288. Otherwise if step 292 is true, the core switching module 212 reads the state of the HP core 204 and copies the state or information representative of the state of the HP core 204 into the high-speed memory 210 in step 296. Alternatively, the state may be copied directly to the core to be activated. In step 300, the core switching module 212 transitions the LP core 200 to the active state. In step 306, the core switching module 212 loads the state of the HP core 204 from the high-speed memory 210 into the LP core 200.

In step 310, the HP core 204 transitions to the inactive state. In step 320, the LP core 200 resumes execution at the loaded state. In step 324, after completing the loaded instructions, the LP core 200 executes at the application level, and control returns to step 252.

Referring now to FIG. 7, steps of another method for operating the LP and HP cores 200 and 204 of FIG. 5 are shown. Control begins in step 328. In step 330, control determines whether the LP core 200 is active. If step 330 is true, the core profile module 240 monitors the system loading or speed of the LP core 200. In step 338, the core profile module 240 monitors the types of applications that are executing. In step 342, control determines whether any of the applications are designated HP type.

When an application is designated as the HP type application, an immediate transition to the HP core 204 may occur when the application is launched. HP type applications may be programmed and/or user designated. Alternately, HP applications may be selected based on a battery charge state. In other words, the application may default to HP core operation except when the batteries are low. When the batteries are low, the application may be forced to operate on the LP core with reduced operating speed or not at all. Still other applications may execute exclusively on the HP core 204.

If step 342 is false, control determines in step 348 whether the system loading is greater than a first threshold. If step 348 is false, control returns to step 330. If step 348 is true, control continues with step 352 and transitions to the HP core 204 using the core switching module 212. In step 356, the core profile module 240 monitors the system loading of the HP core 204. In step 360, control determines whether the system loading is less than a second threshold. If step 360 is false, control returns to step 356. If step 360 is true, control transitions to the LP core 200 in step 376, and control returns to step 330.

If step 342 is true, control continues with step 364 and transitions to the HP core 204 using the core switching module 212. In step 368, control determines whether the HP type application is closed or otherwise terminated. If step 368 is false, the HP core 204 continues executing the HP type application. If step 368 is true, control continues with step 372 and determines whether the system loading after closing the HP type application is less than a second speed threshold. If step 372 is false, control returns to step 372. If step 372 is true, control transitions to the LP core 200 in step 376, and control returns to step 330.

Core switching can be transparent to the OS and the applications when the LP core can resemble or look like the HP core to the rest of the hardware and software of the mobile computing device. When the LP core resembles the HP core, threads scheduled for the LP core may be scheduled for the HP core and vice versa without any modification or thread-coloring. In other words, applications may be executed by either core without regard to characteristics of threads of either core. Accordingly, the core switching becomes transparent to the OS and applications.

The LP core can resemble the HP core when the LP and the HP cores have identical or compatible key core registers and interfaces. Examples of key core registers and interfaces include a CPUID register, a debug register, a cache organization & control register, a CP register, a trace macro, a memory management unit (MMU), and a performance management unit (PMU). Additionally, or alternatively, the LP core may implement a register mapping interface and/or a microsequencer to achieve dynamic compatibility with the HP core. Alternatively, or additionally, the instruction set of the LP core may be the same as or a subset of the instruction set of the HP core.

Referring now to FIGS. 8A and 8B, a glue logic module 380 may be used to enable (i.e., activate) only one core at a time when cores are being switched by a core switching module. In FIG. 8A, the glue logic module 380 may receive external interrupts (e.g., IRQ and FIQ) and other inputs (e.g., trace macro and debug) from other hardware and software of the mobile device. Additionally, the glue logic module 380 may receive wakeup exchange signals from the LP and HP cores 200 and 204 when the LP and HP cores 200 and 204 are being switched. The wakeup exchange signals indicate when one of the LP and HP cores 200 and 204 wakes up and the other shuts down during core switching. Based on the wakeup exchange signals, the glue logic module 380 may route the interrupts and other inputs to one of the LP and HP cores 200 and 204 that is active after cores are switched.

Specifically, in FIG. 8B, the glue logic module 380 may comprise an interrupt control and mux device 382, a trace macro and debug mux device 384, and a mux control module 386. The interrupt control and mux device 382 may receive the external interrupts and may generate masked interrupts and wait-for-interrupt (WFI) signals for the LP and the HP cores 200 and 204 based on the external interrupts. The trace macro and debug mux device 384 may receive the trace macro and debug inputs for the LP and the HP cores 200 and 204.

The mux control module 386 may receive the wakeup exchange signals and may generate a mux control signal based on the wakeup exchange signals. The mux control signal may indicate which one of the LP and HP cores 200 and 204 is active at a time after core switching is complete. Alternatively, the core switching module may control the interrupt control and mux device 382 and the trace macro and debug mux device 384 based on the wakeup exchange signals.

Based on the mux control signal, the interrupt control and mux device 382 may route the masked interrupts and the WFI signals to one of the LP and the HP cores 200 and 204 that is active after cores are switched. The trace macro and debug mux device 384 may route the trace macro and/or debug signals to one of the LP and the HP cores 200 and 204 that is active after cores are switched. Thus, only one of the LP and the HP cores 200 and 204 is active and executes applications at a time.

The LP and HP cores 200 and 204 have symmetric communication capabilities since the glue logic module 380 symmetrically communicates with the LP and HP cores 200 and 204. Specifically, the signals generated by the interrupt control and mux device 382 and the trace macro and debug mux device 384 are symmetrically communicated to the LP and HP cores 200 and 204. Thus, regardless of which of the LP and HP cores 200 and 204 is active at a time, the hardware interfacing and signaling capabilities of the LP and HP cores 200 and 204 are similar. This enables other hardware of the mobile device to communicate with either core without regard or without identifying which core is active.

Additionally, due to the symmetric communication, the programmability of the LP and HP cores 200 and 204 is similar. Specifically, the applications can run transparently on the LP or the HP core 200, 204 that is active without regard or without identifying which core is active. The hardware and software transparency or symmetry provided by the glue logic module 380 enables hardware and software vendors to use, modify, develop, and/or add products normally as if only one core is present.

When the HP core 204 comprises multiple identical cores, the interrupt control and mux device 382 may generate masked interrupts and WFI signals for the respective cores. Additionally, the trace macro and debug mux device 384 may route the trace macro and debug signals to the respective cores.

Referring now to FIGS. 9A and 9B, a power management system (PMS) 400 that optimizes power consumption of the mobile device using dynamic core switching is shown. In FIG. 9A, the PMS 400 comprises a PMS module 402, a core sequence module 413, a core switching module 414, and the glue logic module 380. In some implementations, core switching module 414 may be integrated with a hypervisor module 415. The PMS module 402 comprises a power control module 404, a performance profile module 406, an idle profile module 408, an OS task profile module 410, and a core profile module 412. The PMS module 402 manages power consumption based on user profiles, types of applications being executed, inputs received from the OS, and states of various hardware devices received via respective device drivers.

The power control module 404 may receive inputs related to power/performance from a user via user profiles. For example, the user may specify performance levels for applications regardless of power consumption entailed. Additionally, the power control module 404 may receive inputs from the performance profile module 406, the idle profile module 408, the OS task profile module 410, and the core profile module 412.

The performance profile module 406 may generate outputs indicating current performance and demanded or desired performance for applications. For example, the performance profile module 406 may indicate to the power control module 404 and the core profile module 412 parameters including current core utilization by the applications, cache miss rates, and whether the system load is memory bound, core bound, or I/O bound. The performance profile module 406 may generate the outputs partly based on inputs received from an OS services module 416, a device driver module 418, and cores 420. The cores 420 may comprise LP and one or more HP cores.

The OS services module 416 may comprise a kernel input/output control (IOCTL) module 422 and a scheduling module 424. The kernel IOCTL module 422 may report current I/O usage to the power control module 404. The scheduling module 424 may schedule OS tasks. Examples of OS tasks include number of tasks, number of processes, and thread quantum. The schedule of OS tasks is monitored by the OS task profile module 410 and reported to the power control module 404. The idle profile module 408 may receive inputs from the OS services module 416 and may report to the power control module 404 when the cores 420 are idle.

The device driver module 418 may comprise device drivers that control the hardware devices of the mobile computing device. For example, the device driver module 418 may comprise a battery driver module 426 that controls the battery of the mobile computing device based on signals received from the PMS module 402. The battery driver module 426 may report status of the battery to the power control module 404.

Additionally, the device driver module 418 may comprise a power management interrupt control (PMIC) module 428 that controls power consumed by the hardware devices based on inputs received from the PMS module 402. The device driver module 418 may comprise a performance monitoring unit (PMU) module 430 that monitors performance or resource utilization parameters. The resource utilization parameters may include memory usage, cache usage, bus usage, I/O usage, and CPU usage by the OS and the applications being executed by the cores 420. The PMU module 430 may report resource utilization parameters to the performance profile module 406. Specifically, the PMU module 430 may report when the various resource utilization parameters cross (i.e., exceed or fall below) respective predetermined thresholds when applications are executed by one of the cores 420. The thresholds may be programmable.

The device driver module 418 may further comprise a device timeout and state monitoring module 432 that monitors states of the hardware devices. The device timeout and state monitoring module 432 reports to the power control module 404 when any of the hardware devices are idle or have timed out due to lack of adequate resources available to perform requested tasks. The power control module 404 may shut down idle hardware devices to save power. Alternatively, the power control module 404 may activate (i.e., initiate power up) additional resources so that the hardware devices may render performance by completing the requested tasks instead of timing out.

The core profile module 412, the core sequence module 413, and the core switching module 414 enable core morphing. The core profile module 412 may anticipate or predict power/performance demand based on a history or log of execution of applications. For example, the core profile module 412 may predict a number of million instructions per second (MIPS) requirement of an application based on data cache miss rate, instruction cache miss rate, and/or instructions per cycle being executed by one of the cores 420 that is active. The core profile module 412 may receive the history from at least one of the performance profile module 406, the idle profile module 408, and the OS task profile module 410. Based on the history, the core profile module 412 can anticipate or predict the power/performance that the applications may demand.

The core profile module 412 may generate an event when the power/performance requirement changes to a value greater or less than a threshold value. For example, the core profile module 412 may generate an event when the core utilization or cache miss rate exceeds respective predetermined threshold values. The event is a request for switching cores according to the change in the power/performance demand. Additionally, the core profile module 412 may monitor a frequency of core switching and generate the event to minimize thrashing (i.e., unnecessary switching of cores 420). For example, the core profile module 412 may monitor a number of times the cores 420 are switched in a predetermined time period. The core profile module 412 may generate the event when the number exceeds a dynamically programmable threshold. When the event is received, the power control module 404 may decide to switch cores based solely on the event. Alternatively, the power control module 404 may analyze all the information received including resource utilization (past, current, and projected) and determine whether to switch cores.

Occasionally, the power control module 404 may override the core profile module 412 and decide not to switch cores notwithstanding the event. For example, when the mobile device is powered by line power and the HP core is the active core, the power control module 404 may not switch cores although the event may indicate that the performance requirement is low. Alternatively, when the HP core is the active core and the application is designated as a high-performance application, the power control module 404 may not switch cores although the mobile device is not powered by line power and the event requests a switch to the LP core due to low battery.

In FIG. 9B, the core sequence module 413 may comprise a frequency change sequence (FCS) module 434, a voltage change sequence (VCS) module 436, and a core change sequence (CCS) module 438. When an event is signaled by the core profile module 412, the power control module 404 may generate at least one of three calls to the kernel IOCTL module 422: a FCS call, a VCS call, and/or a CCS call. The kernel IOCTL module 422, in turn, may generate at least one of three sequences: a frequency change sequence, a voltage change sequence, and/or a core change sequence.

Based on the frequency change sequence received, the FCS module 434 may generate signals that change the clock frequency of the active core. Based on the voltage change sequence received, the VCS module 436 may generate signals that change the supply voltage of the active core. Based on the core change sequence received, the CCS module 438 may generate signals that switch the cores 420. The CCS module 438 may initiate the core change sequence in conjunction with the frequency and/or the voltage change sequence. The core change sequences decrease system overhead, system latency, and core transition time. The CCS module 438 is now described in more detail.

When the power control module 404 decides to switch the cores, the PMS module 402 disables interrupts and generates a system call to the hypervisor module 415 and/or the core switching module 414 to switch cores 420. Based on the system call, the CCS module 438 generates a call and outputs the call to the hypervisor module 415 and/or the core switching module 414. The hypervisor module 415 and/or the core switching module 414 switches the cores 420. After the cores 420 are switched, the hypervisor module 415 and/or the core switching module 414 returns control to the kernel IOCTL module 422 and/or the OS services module 416. Subsequently, the newly activated core resumes operation, and the PMS module 402 enables interrupts.

Following are some examples when the CCS module 438 may initiate the core change sequence. The CCS module 438 may initiate the core change sequence to switch from the LP core to the HP core when the core utilization of the LP core is greater than or equal to a high predetermined threshold. For example only, the high predetermined threshold may be a percentage such as 80% or 90%. The CCS module 438 may initiate the core change sequence when the core utilization of the LP core is greater than or equal to the high predetermined threshold for a predetermined time period. The predetermined time period may be short or long. For example only, the predetermined time period may be two or ten seconds. The high predetermined threshold and the predetermined time period can be programmed to optimize performance, power, and minimize core switching that may be unnecessary.

The CCS module 438 may initiate the core change sequence when an anticipated core utilization of the LP core is greater than or equal to the high predetermined threshold. The anticipated core utilization may be determined based on the type of the application being executed and/or the history of execution of the application. For example only, applications tagged by the user as requiring high performance may initiate a core switch from the LP core to the HP core.

The CCS module 438 may initiate the core change sequence to switch from the HP core to the LP core when the core utilization of the HP core is less than or equal to a low predetermined threshold. For example only, the low predetermined threshold may be a percentage such as 5% or 10%. The CCS module 438 may initiate the core change sequence when the core utilization of the HP core is less than or equal to the high predetermined threshold for a predetermined time period. The predetermined time period may be short or long. For example only, the predetermined time period may be two or ten seconds. The low predetermined threshold and the predetermined time period can be programmed to optimize performance, power, and minimize core switching that may be unnecessary.

The CCS module 438 may initiate the core change sequence based on the number of applications being executed by one of LP and HP cores. For example only, the cores may be switched from the LP core to the HP core when the number of applications being executed is 10 or more and from the HP to the LP core when the number of applications being executed is 10 or less. The CCS module 438 may initiate the core change sequence based on the type of applications. For example only, the cores may be switched from the LP core to the HP core when the application being executed is designated as requiring high performance. Finally, the CCS module 438 may initiate the core change sequence based on the type of instruction that is scheduled for execution by one of the cores. For example only, cores may be switched from the LP core to the HP core when the LP core is executing an application and an instruction scheduled for execution can be executed by the HP core instead of the LP core.

More specifically, the CCS module 438 may generate signals that switch the cores 420 as follows. When the CCS module 438 receives the core change sequence, the CCS module 438 outputs the call to the hypervisor module 415 and/or the core switching module 414. The core switching module 414 switches the cores 420 according to the core change sequence. Specifically, the core switching module 414 transfers the state of the active core to the inactive core, performs handshaking between the active and the inactive cores 420, and performs core switching as follows.

The core switching module 414 begins core switching when the PMS module 402 disables interrupts to the cores 420. The core switching module 414 suspends execution of the OS and the applications and isolates the cores 420 from the OS and the applications. The core switching module 414 may save the state of the active core that include core registers, CP registers, stack pointer, program counter, PMU events, and MMU configuration. The core switching module 414 activates the inactive core by turning on or increasing power supply to the clock, L2 cache (e.g., if the inactive core is the HP core), and the inactive core.

Based on the wakeup exchange signals received from the inactive core, the core switching module 414 determines if the inactive core wakes up (i.e., powers up) within a predetermined time after wakeup signals are output to the inactive core. If the inactive core does not acknowledge (i.e., does not wake up or power up) within the predetermined time, the core switching module 414 reloads the state of the active core. The core switching module 414 returns control to the kernel IOCTL module 422 and/or the OS services module 416. The active core resumes executing the application according to the reloaded state, and the PMS module 402 enables interrupts to the active core.

Instead, if the core switching module 414 receives an acknowledgement from the inactive core within the predetermined time, the core switching module 414 transfers the state of the previously active core to the newly activated core. The core switching module 414 initializes the newly activated core with the state of the previously active core. After the newly activated core is initialized, the core switching module 414 shuts down the previously active core to the inactive state by turning off or reducing the power supply to the clock, L2 cache (e.g., if the previously active core is the HP core), and the previously active core. The core switching module 414 returns control to the kernel IOCTL module 422 and/or the OS services module 416. The newly activated core resumes executing the application according to the loaded state. The PMS module 402 enables interrupts to the active core. Thus, the core switching module 414 switches cores securely and in isolation from the OS and the applications and makes the core switching transparent to the OS and the applications.

When the core switching module 414 switches operation from the LP core to the HP core, the OS and applications continue to run as if they would continue to execute on a single core with a stepped-up frequency or supply voltage. On the other hand, when the core switching module 414 switches operation from the HP core to the LP core, the OS and applications continue to run as if they would continue to execute on a single core with a stepped-down frequency or supply voltage.

The core switching module 414 and/or the hypervisor module 415 may communicate to the glue logic module 380 the handshaking information exchanged by the cores 420 during core switching. The handshaking information may include signals that indicate which one of the cores 420 is active, when interrupts are disabled/enabled, etc. Based on the handshaking signals, the glue logic module 380 routes interrupts and other signals from the application to one of the cores 420 that is active.

In use, Core1 may be the LP core, and Core2 may be the HP core. The mobile computing device may normally execute most applications using Core1. Core1 may operate at a frequency and voltage level specified by the frequency change sequence and the voltage change sequence, respectively. The frequency change sequence may include control signals that increase or decrease the clock frequency of the active core sequentially as needed. The voltage change sequence may include control signals that increase or decrease the supply voltage of the active core sequentially as needed.

When high performance is required (e.g., when utilization of Core1 is maximum at current clock frequency and supply voltage), the FCS module 434 may vary the clock frequency of Core1 within a frequency range from low to high based on the frequency change sequence generated for Core1 until the highest and/or desired operating frequency of Core1 is reached. Alternatively, or additionally, the VCS module 436 may change the supply voltage of Core1 within a voltage range from low to high based on the voltage change sequence generated for Core1 until the highest and/or desired operating supply voltage of Core1 is reached.

When still higher performance is demanded by the application (i.e., when utilization of Core1 is maximum at the highest frequency and voltage), the core switching module 414 may begin core switching. The core switching module 414 may activate Core2, handover the state of Core1 to Core2, and shut down Core1 or otherwise render Core1 inactive. Specifically, the core switching module 414 may deactivate Core1 and copy the state of Core1. Then the core switching module 414 may power up Core2. On powering up, when Core2 initializes, the core switching module 414 may handover the state of Core1 to Core2. That is, the core switching module 414 may reset Core2 with the state of Core1. Thereafter, the core switching module 414 may shut down Core1. Core2 may resume executing the application where Core1 entered the inactive state using the state of Core1. The PMS module 402 may enable interrupts. The scheduling module 424 may schedule threads that were to be executed by Core1 for execution by Core2.

Initially, Core2 may operate at a frequency and voltage level specified by the frequency change sequence and the voltage change sequence, respectively. Subsequently, the FCS module 434 may change the clock frequency of Core2 within a frequency range from low to high and then from high to low according to the performance level demanded by the application. Alternatively, or additionally, the VCS module 436 may vary the supply voltage of Core2 within a voltage range from low to high and from high to low according to the performance level demanded by the application. If the HP core comprises a plurality of Core2, each additional Core2 may be activated and deactivated as the performance level demanded by the application continues to vary.

When the performance level demanded by the application decreases to a level at which the performance rendered by Core2 is no longer optimal, efficient, desirable, and/or possible, the core switching module 414 may switch cores. The core switching module 414 may activate Core1, handover the state of Core2 to Core1, and shut down Core2 or otherwise render Core2 inactive. Specifically, the core switching module 414 may deactivate Core2 and copy the state of Core2. Then the core switching module 414 may power up Core1. On powering up, when Core1 initializes, the core switching module 414 may handover the state of Core2 to Core1. That is, the core switching module 414 may reset Core1 with the state of Core2. Core1 may resume executing the application where Core2 entered the inactive state using the state of Core2. The PMS module 402 may enable interrupts. Thereafter, the core switching module 414 may shut down Core2. The scheduling module 424 may schedule threads that were to be executed by Core2 for execution by Core1.

Referring now to FIG. 9C, an exemplary core switching module 414 may comprise a mode switching module 414-1, a core activation module 414-2, and a state transfer module 414-3. The mode switching module 414-1 receives control signals when operation is to be switched from the LP mode to the HP mode or from the HP mode to the LP mode. The core activation module 414-2 stops processing of the application being executed by the presently active core (e.g., Core1) after interrupts to the presently active core are disabled. The core activation module 414-2 activates the presently inactive core (e.g., Core2) and monitors whether the presently inactive core powers up. After the newly activated core (e.g., Core2) powers up, the state transfer module 414-3 transfers the state of the presently active core to the newly activated core. The newly activated core resumes execution of the instructions of the applications, and the core activation module 414-2 enables interrupts to newly activated core. The core activation module 414-2 shuts down the Core1.

Thus, the core switching module 414 may dynamically switch the cores 420 and decrease the power consumption and increase the performance of the mobile device. Additionally, since the core switching module 414 hands over the state of one core to another securely and in isolation when the cores 420 are switched, switching of the cores 420 is transparent to the OS and the applications running on the cores 420. Accordingly, the cores 420 are plug compatible with the existing processing hardware and can replace the existing processing hardware without any hardware modifications.

Referring now to FIG. 10, a method 500 for switching cores 420 using the core switching module 414 is shown. Control begins at step 502. Control determines in step 504 whether the core profile module 412 generated an event to switch cores 420 (e.g., from an active core, Core1, to an inactive core, Core2). If the result of step 504 is false, control waits until the core profile module 412 generates the event to switch cores 420. If the result of step 504 is true, the power control module 404 determines in step 506 whether the cores 420 may be switched based on current and/or anticipated resource utilization. If the result of step 506 is false, control disregards the event and returns to step 504. If the result of step 506 is true, control proceeds to step 508.

Control disables interrupts in step 508. Core1 completes any pending read/write (R/W) commands being executed by Core1 in step 510. Control generates a system management interrupt (SMI) call to the core switching module 414 in step 512 to switch cores 420 (e.g., deactivate the active core, Core1, and activate the inactive core, Core2).

Control saves the state of the active core, Core1, in step 514. Control flushes L1 cache of Core1 in step 516 for coherency. Control sends the event to the inactive core, Core2, in step 518. Control determines in step 520 whether Core2 has acknowledged the event by powering up and by transitioning to the active state. If the result of step 520 is true, control turns off or otherwise reduces power to Core1 in step 521. Control loads the saved state of Core1 into Core2 in step 522. Core2 resumes execution of applications in step 524 where Core1 left off. Control enables interrupts in step 526. Control returns to step 504.

If, however, the result of step 520 is false (i.e., if Core2 does not acknowledge the event and does not power up), control reloads the state of Core1 into Core1 in step 528. Core1 resumes execution of applications in step 530. Control enables interrupts in step 532. Control returns to step 504.

Figure 11A:
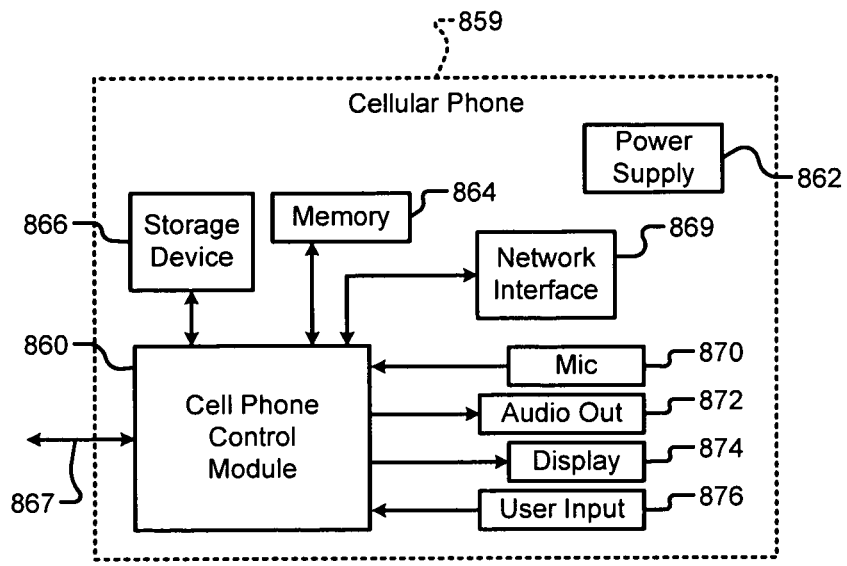
FIG. 11A is a functional block diagram of an exemplary cellular phone.

FIGS. 11A-11E, various exemplary implementations incorporating the teachings of the present disclosure are shown. In FIG. 11A, the teachings of the disclosure can be implemented in a multi-core control module of a cellular phone 858. The cellular phone 858 includes a cell phone control module 860, a power supply 862, memory 864, a storage device 866, and a cellular network interface 867, which may include an antenna. The cellular phone 858 may include a network interface 868, a microphone 870, an audio output 872 such as a speaker and/or output jack, a display 874, and a user input device 876 such as a keypad and/or pointing device. If the network interface 868 includes a wireless local area network interface, an antenna 869 may be included.

The cell phone control module 860 may implement the multi-core control module according to the teachings of the present disclosure. The cell phone control module 860 may receive input signals from the cellular network interface 867, the network interface 868, the microphone 870, and/or the user input device 876. The cell phone control module 860 may process signals, including encoding, decoding, filtering, and/or formatting, and generate output signals. The output signals may be communicated to one or more of memory 864, the storage device 866, the cellular network interface 867, the network interface 868, and the audio output 872.

Memory 864 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 866 may include an optical storage drive, such as a DVD drive, and/or a hard disk drive (HDD). The power supply 862 provides power to the components of the cellular phone 858.

Figure 11B:
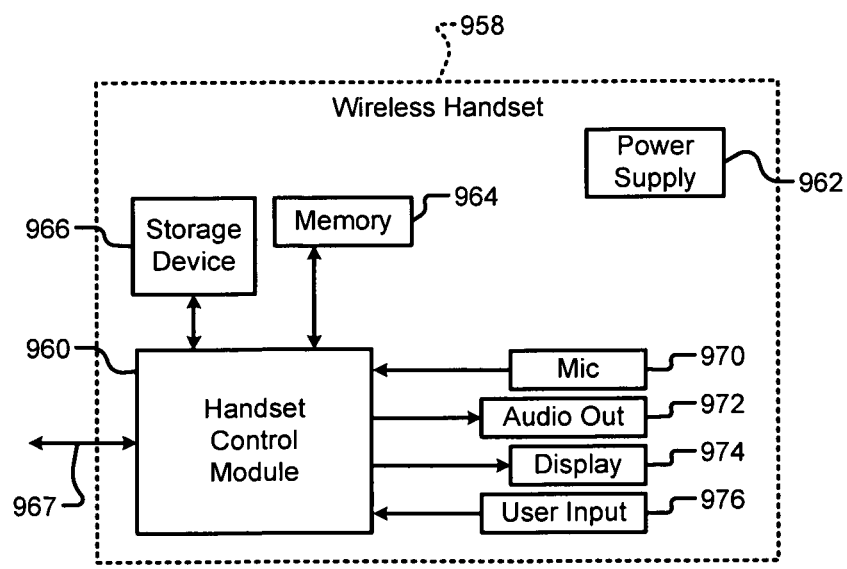
FIG. 11B is a functional block diagram of an exemplary wireless handset that communicates with a base station.

In FIG. 11B, the teachings of the disclosure can be implemented in a multi-core control module of a wireless handset 958. The wireless handset 958 includes a phone control module 960, a power supply 962, memory 964, a storage device 966, and a base station interface 967, which may include an antenna (not shown). The wireless handset 958 may include a microphone 970, an audio output 972 such as a speaker and/or output jack, a display 974, and a user input device 976 such as a keypad and/or pointing device.

The handset control module 960 may implement the multi-core control module according to the teachings of the present disclosure. The handset control module 960 may receive input signals from the base station interface 967, the network interface 968, the microphone 970, and/or the user input device 976. The handset control module 960 may process signals, including encoding, decoding, filtering, and/or formatting, and generate output signals. The output signals may be communicated to one or more of memory 964, the storage device 966, the base station interface 967 and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the wireless handset 958.

Figure 11C:
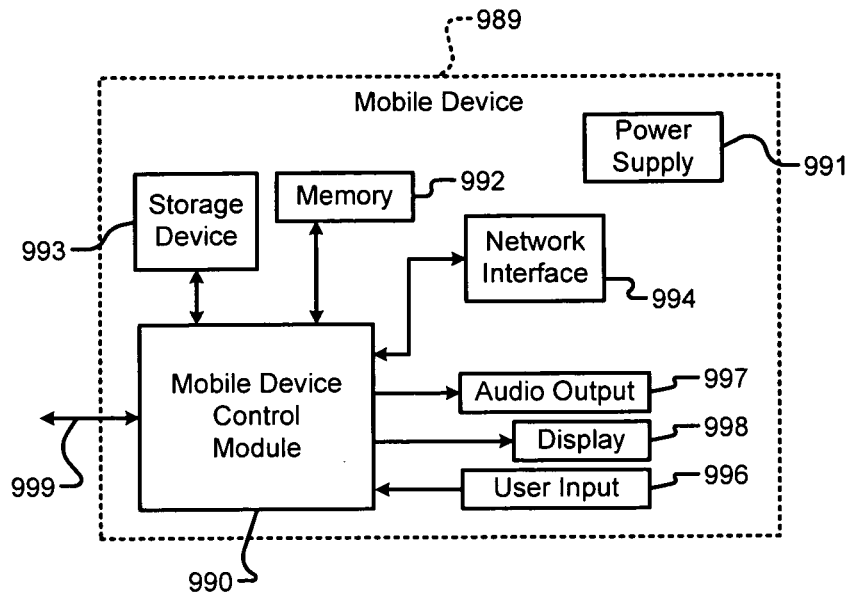
FIG. 11C is a functional block diagram of an exemplary mobile device.

In FIG. 11C, the teachings of the disclosure can be implemented in a multi-core control module of a mobile device 989. The mobile device 989 may comprise a mobile device control module 990, a power supply 991, memory 992, a storage device 993, a network interface 994, and an external interface 999. If the network interface 994 includes a wireless local area network interface, an antenna (not shown) may be included.

The mobile device control module 990 may implement the multi-core control module according to the teachings of the present disclosure. The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Figure 11D:
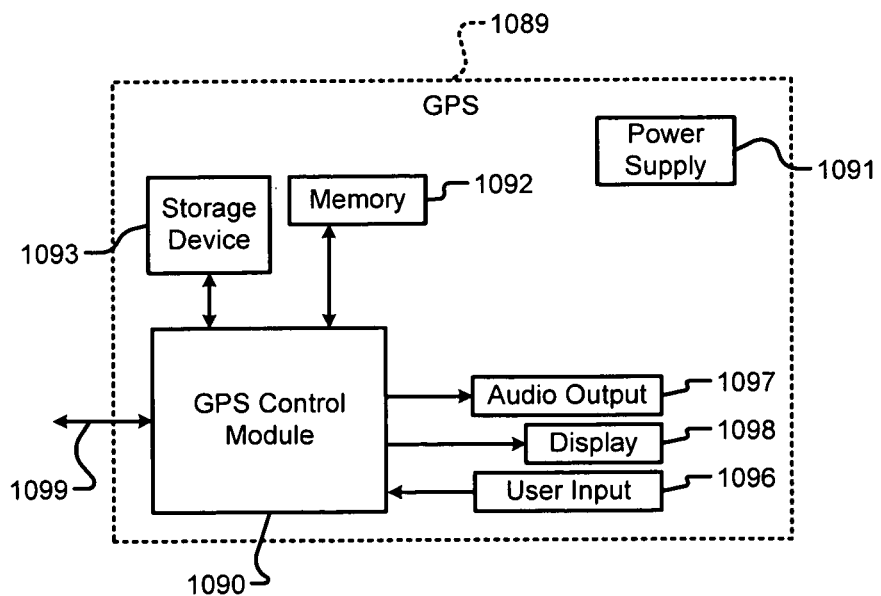
FIG. 11D is a functional block diagram of an exemplary global positioning system (GPS)

In FIG. 11D, the teachings of the disclosure can be implemented in a multi-core control module of a global positioning system (GPS) 1089. The GPS 1089 may include a GPS control module 1090, a power supply 1091, memory 1092, a storage device 1093, and an external interface 1099.

The GPS control module 1090 may implement the multi-core control module according to the teachings of the present disclosure. The GPS control module 1090 may receive input signals from the external interface 1099. The external interface 1099 may include wireless signals, USB, infrared, and/or Ethernet. The input signals may include compressed audio and/or video, and may be compliant with the MP3 format. Additionally, the GPS control module 1090 may receive input from a user input 1096 such as a keypad, touchpad, or individual buttons. The GPS control module 1090 may process input signals, including encoding, decoding, filtering, and/or formatting, and generate output signals.

The GPS control module 1090 may output audio signals to an audio output 1097 and video signals to a display 1098. The audio output 1097 may include a speaker and/or an output jack. The display 1098 may present a graphical user interface, which may include menus, icons, etc. The power supply 1091 provides power to the components of the mobile device 1089. Memory 1092 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1093 may include an optical storage drive, such as a DVD drive, and/or a hard disk drive (HDD). The mobile device may include a personal digital assistant, a media player, a laptop computer, a gaming console, or other mobile computing device.

Figure 11E:
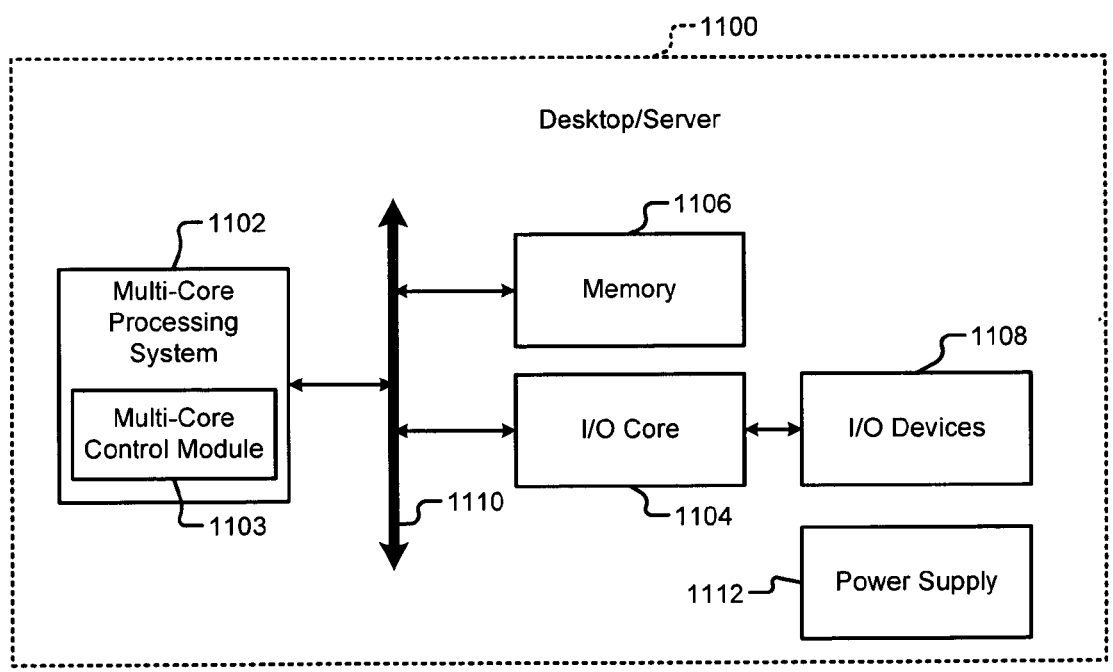
FIG. 11E is a functional block diagram of a desktop computer and/or a server.

In FIG. 11E, the teachings of the disclosure can be implemented in a multi-core control module 1103 of a desktop computer and/or a server 1100. The desktop computer and/or server 1100 may comprise a multi-core processing system 1102 that includes the multi-core control module 1103. The desktop computer and/or server 1100 may further comprise an I/O core 1104, memory 1106, and I/O devices 1108. The desktop computer and/or server 1100 may be powered by a power supply 1112.

The multi-core processing system 1102, the I/O core 1104, and memory 1106 may communicate via a system bus 1110. The I/O devices 1108 may include hard disk drives (HDDs), compact disc (CD) drives, digital versatile disc (DVD) drives, display, keyboard, and other I/O devices. The I/O core 1104 may comprise I/O controllers that control the I/O devices 1108. The multi-core processing system 1102 may execute an operating system (OS) and applications stored on the HDDs, CD drives, and/or the DVD drives. The multi-core control module 1103 may provide increased power savings and increased performance when the multi-core processing system 1102 executes applications.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A device comprising:
a first memory that stores an operating system (OS), said OS including a kernel that provides services to applications;
a core switching module that switches operation between a first mode and a second mode,
wherein during said first mode, instructions associated with said applications are executed by a first asymmetric core, and a second asymmetric core is inactive, and
wherein during said second mode, said instructions are executed by said second asymmetric core, and said first asymmetric core is inactive, and
wherein said core switching module operates at a level above said kernel; and
a core profile module that generates an anticipated instruction execution rate for executing said applications based on at least one of: a data cache miss rate, an instruction cache miss rate, and instructions per cycle executed by said first asymmetric core,
wherein said core switching module switches operation between said first mode and second mode based on said anticipated instruction execution rate.

2. The device of claim 1 wherein said core switching module switches operation between said first mode and said second mode transparently to said OS.

3. The device of claim 1 wherein said core switching module comprises:
a mode switching module that receives a switch signal to switch operation between said first mode and said second mode;
a core activation module that stops processing of said applications by said first asymmetric core after interrupts to said first asymmetric core are disabled; and
a state transfer module that transfers a state of said first asymmetric core to said second asymmetric core in response to said core activation module stopping said processing of said applications,
wherein said core activation module (i) allows said second asymmetric core to resume execution of said instructions based on said state of said first asymmetric core at the time said processing of said applications was stopped, and (ii) enables said interrupts to said second asymmetric core.

4. The device of claim 1 wherein said second asymmetric core executes said instructions without instruction translation when said second asymmetric core resumes executing said instructions during said second mode.

5. The device of claim 1 wherein a first maximum speed and a first maximum operating power level of said first asymmetric core are greater than a second maximum speed and a second maximum operating power level of said second asymmetric core, respectively.

6. The device of claim 1 wherein said core switching module supplies one of no power and standby power to said first asymmetric core when said second asymmetric core resumes execution of said instructions.

7. The device of claim 1 further comprising:
a core change sequence (CCS) module that generates a CCS based on at least one of a data cache miss rate, an instruction cache miss rate, and instructions per cycle executed by one of said first and second asymmetric cores, wherein said core switching module powers up one of said first and second asymmetric cores and shuts down another of said first and second asymmetric cores based on said CCS.

8. The device of claim 1, further comprising a second memory that communicates with said first asymmetric core and said second asymmetric core, wherein said core switching module is loaded into said second memory after said operating system is booted.

9. A core switching system, comprising:
a mode switching module that receives a switch signal to switch operation between a first mode and a second mode,
wherein during said first mode, instructions associated with applications are executed by a first asymmetric core, and a second asymmetric core is inactive,
wherein during said second mode, said instructions are executed by said second asymmetric core, and said first asymmetric core is inactive;
a core activation module that stops processing of said applications during a time that said first asymmetric core is executing said instructions of said applications in response to interrupts to said first asymmetric core being disabled;
a state transfer module that transfers a state of said first asymmetric core to said second asymmetric core in response to said core activation module stopping said processing of said applications,
wherein said core activation module allows said second asymmetric core to resume execution of said instructions based on said state of said first asymmetric core at the time said processing of said applications was stopped, and wherein said interrupts to said second asymmetric core are enabled; and
a core profile module that
generates an anticipated instruction execution rate for executing said instructions of said applications based on at least one of: a data cache miss rate, an instruction cache miss rate, and instructions per cycle executed by said first asymmetric core, and
generates said switch signal based on said anticipated instruction execution rate.

10. The core switching system of claim 9 wherein said instructions are executed without instruction translation when said second asymmetric core resumes executing said instructions during said second mode.

11. The core switching system of claim 9 wherein a first maximum speed and a first maximum operating power level of said first asymmetric core are greater than a second maximum speed and a second maximum operating power level of said second asymmetric core, respectively.

12. The core switching system of claim 9 wherein said core activation module supplies one of no power and standby power to said first asymmetric core when said second asymmetric core resumes execution of said instructions.

13. The core switching system of claim 9 further comprising a core change sequence (CCS) module that generates a CCS based on said switch signal, wherein said core activation module powers up one of said first and second asymmetric cores and shuts down another of said first and second asymmetric cores based on said CCS.

14. A method comprising:
in a first mode, executing instructions associated with applications using a first asymmetric core while a second asymmetric core is inactive;
in a second mode, executing said instructions using said second asymmetric core while said first asymmetric core is inactive;
receiving a switch signal to switch operation between said first mode and said second mode;
disabling interrupts to said first asymmetric core during said first mode based on said switch signal;
in response to said interrupts to said first asymmetric core being disabled,
stopping processing of said applications by said first asymmetric core,
transferring a state of said first asymmetric core to said second asymmetric core;
allowing said second asymmetric core to resume execution of said instructions based on said state of said first asymmetric core at a time said processing of said applications was stopped;
enabling said interrupts to said second asymmetric core; and
generating an anticipated instruction execution rate for executing said applications based on at least one of: a data cache miss rate, an instruction cache miss rate, and instructions per cycle executed by said first asymmetric core; and
generating said switch signal based on said anticipated instruction execution rate.

15. The method of claim 14 further comprising executing said instructions without instruction translation when said second asymmetric core resumes executing said instructions during said second mode.

16. The method of claim 14 further comprising:
providing said first asymmetric core having a first maximum speed and a first maximum operating power level; and
providing said second asymmetric core having a second maximum speed and a second maximum operating power level,
wherein said first maximum speed and said first maximum operating power level are greater than said second maximum speed and said second maximum operating power level, respectively.

17. The method of claim 14 further comprising supplying one of no power and standby power to said first asymmetric core when said second asymmetric core resumes execution of said instructions.

18. The method of claim 14 further comprising:
generating a core change sequence (CCS) based on said switch signal;
powering up one of said first and second asymmetric cores based on said CCS; and
shutting down another of said first and second asymmetric cores based on said CCS.

19. A method comprising:
storing an operating system (OS), said OS including a kernel that provides services to applications;
in a first mode, executing instructions associated with said applications using a first asymmetric core while a second asymmetric core is inactive;
in a second mode, executing said instructions using said second asymmetric core while said first asymmetric core is inactive;
switching operation between said first mode and said second mode using a core switching module;

executing said core switching module at a level above said kernel;

generating an anticipated instruction execution rate for executing said applications based on at least one of: a data cache miss rate, an instruction cache miss rate, and instructions per cycle executed by said first asymmetric core; and switching operation between said first mode and said second mode based on said anticipated instruction execution rate.

20. The method of claim 19 further comprising switching operation between said first mode and said second mode transparently to said OS.

21. The method of claim 19 further comprising:
receiving a switch signal to switch operation between said first mode and said second mode;
stopping processing of said applications by said first asymmetric core after interrupts to said first asymmetric core are disabled;
transferring a state of said first asymmetric core to said second asymmetric core in response to stopping said processing of said applications;
allowing said second asymmetric core to resume execution of said instructions based on said state of said first asymmetric core at the time said processing of said applications was stopped; and
enabling said interrupts to said second asymmetric core.

22. The method of claim 19 further comprising executing said instructions without instruction translation when said second asymmetric core resumes executing said instructions during said second mode.

23. The method of claim 19 further comprising:
providing said first asymmetric core having a first maximum speed and a first maximum operating power level; and
providing said second asymmetric core having a second maximum speed and a second maximum operating power level,
wherein said first maximum speed and said first maximum operating power level are greater than said second maximum speed and said second maximum operating power level, respectively.

24. The method of claim 19 further comprising supplying one of no power and standby power to said first asymmetric core when said second asymmetric core resumes execution of said instructions.

25. The method of claim 19 further comprising:
generating a core change sequence (CCS) based on at least one of a data cache miss rate, an instruction cache miss rate, and instructions per cycle executed by said first asymmetric core;
powering up one of said first and second asymmetric cores based on said CCS; and
shutting down another of said first and second asymmetric cores based on said CCS.

26. A non-transitory computer program stored on a computer readable medium and executed by a processor, comprising:
in a first mode, executing instructions associated with applications using a first asymmetric core while a second asymmetric core is inactive;
in a second mode, executing said instructions using said second asymmetric core while said first asymmetric core is inactive;
receiving a switch signal to switch operation between said first mode and said second mode;

disabling interrupts to said first asymmetric core during said first mode based on said switch signal;
in response to said interrupts to said first asymmetric core being disabled,
stopping processing of said applications by said first asymmetric core after said interrupts are disabled;
transferring a state of said first asymmetric core to said second asymmetric core;
allowing said second asymmetric core to resume execution of said instructions based on said state of said first asymmetric core at a time said processing of said applications was stopped;
enabling said interrupts to said second asymmetric core; and
generating an anticipated instruction execution rate for executing said applications based on at least one of: a data cache miss rate, an instruction cache miss rate, and instructions per cycle executed by said first asymmetric core; and
generating said switch signal based on said anticipated instruction execution rate.

27. The computer program of claim 26 further comprising executing said instructions without instruction translation when said second asymmetric core resumes executing said instructions during said second mode.

28. The computer program of claim 26 further comprising:
providing said first asymmetric core having a first maximum speed and a first maximum operating power level; and
providing said second asymmetric core having a second maximum speed and a second maximum operating power level,
wherein said first maximum speed and said first maximum operating power level are greater than said second maximum speed and said second maximum operating power level, respectively.

29. The computer program of claim 26 further comprising supplying one of no power and standby power to said first asymmetric core when said second asymmetric core resumes execution of said instructions.

30. The computer program of claim 26 further comprising:
generating a core change sequence (CCS) based on said switch signal;
powering up one of said first and second asymmetric cores based on said CCS; and
shutting down another of said first and second asymmetric cores based on said CCS.

31. A non-transitory computer program stored on a computer readable medium and executed by a processor, comprising:
storing an operating system (OS), said OS including a kernel that provides services to applications;
in a first mode, executing instructions associated with said applications using a first asymmetric core while a second asymmetric core is inactive;
in a second mode, executing said instructions using said second asymmetric core while said first asymmetric core is inactive;
switching operation between said first mode and said second mode using a core switching module;
executing said core switching module at a level above said kernel;
generating an anticipated instruction execution rate for executing said applications based on at least one of: a data cache miss rate, an instruction cache miss rate, and instructions per cycle executed by said first asymmetric core; and switching operation between one of said first mode and said second mode based on said anticipated instruction execution rate.

32. The computer program of claim 31 further comprising switching operation between said first mode and said second mode transparently to said OS.

33. The computer program of claim 31 further comprising:
receiving a switch signal to switch operation between said first mode and said second mode;
stopping processing of said applications by said first asymmetric core after interrupts to said first asymmetric core are disabled;
transferring a state of said first asymmetric core to said second asymmetric core in response to stopping said processing of said applications;
allowing said second asymmetric core to resume execution of said instructions based on said state of said first asymmetric core at the time said processing of said applications was stopped; and
enabling said interrupts to said second asymmetric core.

34. The computer program of claim 31 further comprising executing said instructions without instruction translation when said second asymmetric core resumes executing said instructions during said second mode.

35. The computer program of claim 31 further comprising:
providing said first asymmetric core having a first maximum speed and a first maximum operating power level; and
providing said second asymmetric core having a second maximum speed and a second maximum operating power level,
wherein said first maximum speed and said first maximum operating power level are greater than said second maximum speed and said second maximum operating power level, respectively.

36. The computer program of claim 31 further comprising supplying one of no power and standby power to said first asymmetric core when said second asymmetric core resumes execution of said instructions.

37. The computer program of claim 31 further comprising:
generating a core change sequence (CCS) based on at least one of a data cache miss rate, an instruction cache miss rate, and instructions per cycle executed by said first asymmetric core;
powering up one of said first and second asymmetric cores based on said CCS; and
shutting down another of said first and second asymmetric cores based on said CCS.

* * * * *